(12) United States Patent
Allen

(10) Patent No.: US 8,952,104 B2
(45) Date of Patent: Feb. 10, 2015

(54) POLYMER COMPOSITIONS AND METHODS

(75) Inventor: Scott D. Allen, Ithaca, NY (US)

(73) Assignee: Novomer, Inc., Ithaca, NY (US)

( * ) Notice: Subject to any disclaimer, the term of this patent is extended or adjusted under 35 U.S.C. 154(b) by 0 days.

(21) Appl. No.: 13/977,059

(22) PCT Filed: Jan. 6, 2012

(86) PCT No.: PCT/US2012/020523
§ 371 (c)(1),
(2), (4) Date: Jun. 28, 2013

(87) PCT Pub. No.: WO2012/094619
PCT Pub. Date: Jul. 12, 2012

(65) Prior Publication Data
US 2013/0281633 A1    Oct. 24, 2013

Related U.S. Application Data

(60) Provisional application No. 61/430,312, filed on Jan. 6, 2011.

(51) Int. Cl.
*C08G 65/32* (2006.01)
*C08G 64/42* (2006.01)
*C08G 64/02* (2006.01)
*C08G 71/02* (2006.01)

(52) U.S. Cl.
CPC ............ *C08G 64/42* (2013.01); *C08G 64/0216* (2013.01)
USPC ...................................................... 525/409

(58) Field of Classification Search
USPC ........................................................ 525/409
See application file for complete search history.

(56) References Cited

U.S. PATENT DOCUMENTS

| | | |
|---|---|---|
| 4,851,507 A | 7/1989 | Kesling, Jr. et al. |
| 4,959,411 A | 9/1990 | Gambale et al. |
| 5,342,554 A | 8/1994 | McBain et al. |
| 5,698,661 A | 12/1997 | Ferruti et al. |
| 2006/0226401 A1 | 10/2006 | Xiao et al. |
| 2009/0105443 A1 | 4/2009 | Brack et al. |
| 2010/0120993 A1 | 5/2010 | Chatterjee et al. |
| 2010/0230650 A1 | 9/2010 | Nagoh et al. |
| 2011/0218127 A1 | 9/2011 | Allen et al. |
| 2011/0230580 A1 | 9/2011 | Allen et al. |
| 2013/0172482 A1 | 7/2013 | Allen et al. |

FOREIGN PATENT DOCUMENTS

| | | |
|---|---|---|
| CA | 2742119 A1 | 6/2010 |
| WO | WO-2010/028362 A1 | 3/2010 |
| WO | WO-2010/033703 A1 | 3/2010 |
| WO | WO-2010/033705 A1 | 3/2010 |
| WO | WO-2012/094619 A1 | 7/2012 |

OTHER PUBLICATIONS

International Search Report of PCT/US12/20523, 2 pages (May 10, 2012).
Written Opinion of PCT/US12/20523, 8 pages (May 10, 2012).
Chen et al., Synthesis, Characterization, and Epoxidation of an Aliphatic Polycarbonate from 2,2-(2-Pentene-1,5-diyl) trimethylene Carbonate (cHTC) Ring-Opening Polymerization, Macromolecules, 30(12): 3470-3476 (1997).
International Search Report for PCT/US2011/49460, mailed Jan. 27, 2012.
Ramakrishna et al., Biomedical applications of polymer-composite materials: a review, Composites Science and Technology, 61: 1189-1224 (2001).
Wilen, S. H., et al., Strategies in optical resolutions, Tetrahedron, 33(21): 2725-2736 (1977).
Written Opinion for PCT/US2011/49460, 25 pages (Jan. 27, 2012).

*Primary Examiner* — Terressa Boykin
(74) *Attorney, Agent, or Firm* — Choate, Hall & Stewart LLP; Charles E. Lyon; John P. Rearick

(57) ABSTRACT

The present disclosure describes polymer compositions comprising aliphatic polycarbonate chains containing epoxy functional groups. In certain embodiments, the aliphatic polycarbonate chains comprise epoxy functional groups capable of participating in epoxide ring-opening reactions. In certain embodiments, the invention encompasses composites formed by the reaction of nucleophilic reagents and epoxide functional groups, wherein the epoxide functional groups are located on aliphatic polycarbonate chains.

64 Claims, No Drawings

POLYMER COMPOSITIONS AND METHODS

CROSS REFERENCE TO RELATED APPLICATIONS

The present application claims priority to U.S. Provisional Patent Application Ser. No. 61/430,312, filed Jan. 6, 2011, the entire contents of which are hereby incorporated herein by reference.

FIELD OF THE INVENTION

This invention pertains to the field of polymers. More particularly, the invention pertains to aliphatic polycarbonate compositions having epoxide functionality.

SUMMARY OF THE INVENTION

In one aspect, the present invention encompasses polymer compositions comprising aliphatic polycarbonate chains containing epoxy functional groups. In certain embodiments, aliphatic polycarbonate chains comprise epoxy functionality on each chain end.

In certain embodiments, aliphatic polycarbonate chains contain a primary repeating unit having a structure:

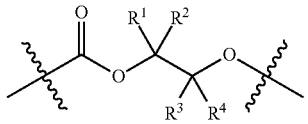

where $R^1$, $R^2$, $R^3$, and $R^4$ are, at each occurrence in the polymer chain, independently selected from the group consisting of —H, fluorine, an optionally substituted $C_{1-40}$ aliphatic group, an optionally substituted $C_{1-20}$ heteroaliphatic group, and an optionally substituted aryl group, where any two or more of $R^1$, $R^2$, $R^3$, and $R^4$ may optionally be taken together with intervening atoms to form one or more optionally substituted rings optionally containing one or more heteroatoms.

In certain embodiments, such aliphatic polycarbonate chains are derived from the copolymerization of carbon dioxide with one or more epoxide substrates. Such copolymerizations are exemplified in published PCT application WO 2010/028362, the entirety of which is incorporated herein by reference. In some embodiments, aliphatic polycarbonate chains are derived from ethylene oxide, propylene oxide, or optionally substituted $C_{4-30}$ aliphatic epoxides, or mixtures of two or more of these. In some embodiments, aliphatic polycarbonate chains have a number average molecular weight (Mn) less than about 20,000 g/mol.

In certain embodiments, epoxy functional groups in aliphatic polycarbonate chains are present at the chain ends. Such groups may be introduced in a post-polymerization step such as by alkylating, esterifying, or carbamoylating the hydroxyl end groups of the aliphatic polycarbonate chains with molecules containing one or more functional groups reactive with hydroxyl groups and one or more epoxy functional groups. In certain embodiments, a functional group that reacts with a hydroxyl end-group is an ester, an acid, an acid anhydride, or an acid halide. In some embodiments, a functional group that reacts with a hydroxyl end-group is an alkyl halide or a sulfonate ester. In certain embodiments, a molecule containing one or more functional groups reactive with hydroxyl groups and one or more epoxy functional groups is epichlorohydrin, in which case the epoxide may be the reactive group and the resulting chlorohydrin may then form an epoxide either spontaneously or in a subsequent step.

In some embodiments, epoxy groups may be introduced by performing a sequence of two or more reactions. In some embodiments, an aliphatic polycarbonate containing one or more olefinic groups is provided and treated under conditions to convert the olefinic group(s) into epoxy groups. In certain embodiments, an olefinic moiety is introduced by performing a copolymerization of carbon dioxide with one or more epoxides in the presence of chain transfer agents and/or polymerization initiators, where the initiators and/or chain transfer agents contain sites of olefinic unsaturation along with one or more functional groups capable of initiating the copolymerization of epoxides and carbon dioxide, followed by a step to transform such olefinic unsaturation sites into epoxy functional groups.

In certain embodiments, sites of olefinic unsaturation in the polycarbonate chains are present in a multifunctional initiator embedded within the aliphatic polycarbonate chains. Such groups may be introduced by using chain transfer agents and/or polymerization initiators that contain two or more sites capable of initiating the copolymerization of epoxides and carbon dioxide and also contain one or more sites of olefinic unsaturation. Preferably, such olefinic groups comprise olefins that can be readily epoxidized.

In certain embodiments, olefinic unsaturation in aliphatic polycarbonate chains is present on a sidechain of one or more the repeating units of the polymer chains. In some embodiments, such groups may be introduced by conducting a copolymerization of carbon dioxide and a mixture of epoxide monomers where some of the epoxide monomers have sidechains containing olefinic unsaturation. In certain embodiments, epoxides bearing sidechains containing olefinic unsaturation are glycidyl esters or glycidyl ethers. In some embodiments, the olefinic groups on these glycidyl esters or ethers are olefins that can be readily epoxidized.

In another aspect, the present invention encompasses methods of producing aliphatic polycarbonates containing epoxy groups. In certain embodiments, these methods include the step of modifying hydroxyl groups at the ends of the aliphatic polycarbonate chains. In some embodiments, these methods include the step of copolymerizing carbon dioxide, one or more $C_{2-40}$ epoxides, and a glycidyl ether or glycidyl ester, wherein the glycidyl compounds contain one or more sites of olefinic unsaturation. In certain embodiments, the methods include copolymerizing carbon dioxide and one or more $C_{2-30}$ epoxides in the presence of initiators and/or chain transfer agents, wherein the initiator or chain transfer agents contain one or more sites of olefinic unsaturation. In some embodiments, these methods include a step of epoxidizing one or more olefin groups present on a polycarbonate chain. In some embodiments, these methods include a step of converting a chlorohydrin moiety into an epoxide functional group. In some embodiments, the methods include combinations of two or more of these steps.

In another aspect, the present invention includes compositions formed by cross-linking or chain-extending aliphatic polycarbonate chains containing epoxy functional groups by contacting the chains with compounds containing nucleophilic functional groups under conditions suited for epoxide ring opening. In some embodiments, such nucleophilic groups are selected from acrylates, carboxylic acids, amines, sulfides, alcohols, or combinations of two or more of these. In certain embodiments, the present invention also encompasses methods for performing such copolymerizations and cross-linking reactions.

In another aspect, the present invention comprises composites derived from epoxide-ring opening reactions of compositions containing aliphatic polycarbonate chains having epoxide functional groups. In certain embodiments, such compositions are epoxy coatings. In certain embodiments, such epoxy coatings are suitable for use as can linings. In certain embodiments, the present invention encompasses methods of coating articles with such epoxy coatings and articles coated with the epoxy coatings.

DEFINITIONS

Definitions of specific functional groups and chemical terms are described in more detail below. For purposes of this invention, the chemical elements are identified in accordance with the Periodic Table of the Elements, CAS version, Handbook of Chemistry and Physics, 75th Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, $5^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, $3^{rd}$ Edition, Cambridge University Press, Cambridge, 1987; the entire contents of each of which are incorporated herein by reference.

Certain compounds of the present invention can comprise one or more asymmetric centers, and thus can exist in various stereoisomeric forms, e.g., enantiomers and/or diastereomers. Thus, inventive compounds and compositions thereof may be in the form of an individual enantiomer, diastereomer or geometric isomer, or may be in the form of a mixture of stereoisomers. In certain embodiments, the compounds of the invention are enantiopure compounds. In certain other embodiments, mixtures of enantiomers or diastereomers are provided.

Furthermore, certain compounds, as described herein may have one or more double bonds that can exist as either the Z or E isomer, unless otherwise indicated. The invention additionally encompasses the compounds as individual isomers substantially free of other isomers and alternatively, as mixtures of various isomers, e.g., racemic mixtures of enantiomers. In addition to the above-mentioned compounds per se, this invention also encompasses compositions comprising one or more compounds.

As used herein, the term "isomers" includes any and all geometric isomers and stereoisomers. For example, "isomers" include cis- and trans-isomers, E- and Z-isomers, R- and S-enantiomers, diastereomers, (D)-isomers, (L)-isomers, racemic mixtures thereof, and other mixtures thereof, as falling within the scope of the invention. For instance, a stereoisomer may, in some embodiments, be provided substantially free of one or more corresponding stereoisomers, and may also be referred to as "stereochemically enriched."

Where a particular enantiomer is preferred, it may, in some embodiments be provided substantially free of the opposite enantiomer, and may also be referred to as "optically enriched." "Optically enriched," as used herein, means that the compound is made up of a significantly greater proportion of one enantiomer. In certain embodiments the compound is made up of at least about 90% by weight of a preferred enantiomer. In other embodiments the compound is made up of at least about 95%, 98%, or 99% by weight of a preferred enantiomer. Preferred enantiomers may be isolated from racemic mixtures by any method known to those skilled in the art, including chiral high pressure liquid chromatography (HPLC) and the formation and crystallization of chiral salts or prepared by asymmetric syntheses. See, for example, Jacques, et al., *Enantiomers, Racemates and Resolutions* (Wiley Interscience, New York, 1981); Wilen, S. H., et al., Tetrahedron 33:2725 (1977); Eliel, E. L. *Stereochemistry of Carbon Compounds* (McGraw-Hill, NY, 1962); Wilen, S. H. *Tables of Resolving Agents and Optical Resolutions* p. 268 (E. L. Eliel, Ed., Univ. of Notre Dame Press, Notre Dame, Ind. 1972).

The terms "halo" and "halogen" as used herein refer to an atom selected from fluorine (fluoro, —F), chlorine (chloro, —Cl), bromine (bromo, —Br), and iodine (iodo, —I).

The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-40 carbon atoms. In certain embodiments, aliphatic groups contain 1-12 carbon atoms. In certain embodiments, aliphatic groups contain 1-8 carbon atoms. In certain embodiments, aliphatic groups contain 1-6 carbon atoms. In some embodiments, aliphatic groups contain 1-5 carbon atoms, in some embodiments, aliphatic groups contain 1-4 carbon atoms, in yet other embodiments aliphatic groups contain 1-3 carbon atoms, and in yet other embodiments aliphatic groups contain 1 or 2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "unsaturated", as used herein, means that a moiety has one or more double or triple bonds.

The terms "cycloaliphatic", "carbocycle", or "carbocyclic", used alone or as part of a larger moiety, refer to a saturated or partially unsaturated cyclic aliphatic monocyclic or polycyclic ring systems, as described herein, having from 3 to 12 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. In some embodiments, the cycloalkyl has 3-6 carbons. The terms "cycloaliphatic", "carbocycle" or "carbocyclic" also include aliphatic rings that are fused to one or more aromatic or nonaromatic rings, such as decahydronaphthyl or tetrahydronaphthyl, where the radical or point of attachment is on the aliphatic ring.

The term "alkyl," as used herein, refers to saturated, straight- or branched-chain hydrocarbon radicals derived from an aliphatic moiety containing between one and six carbon atoms by removal of a single hydrogen atom. Unless otherwise specified, alkyl groups contain 1-12 carbon atoms. In certain embodiments, alkyl groups contain 1-8 carbon atoms. In certain embodiments, alkyl groups contain 1-6 carbon atoms. In some embodiments, alkyl groups contain 1-5 carbon atoms, in some embodiments, alkyl groups contain 1-4 carbon atoms, in yet other embodiments alkyl groups contain 1-3 carbon atoms, and in yet other embodiments alkyl groups contain 1-2 carbon atoms. Examples of alkyl radicals include, but are not limited to, methyl, ethyl, n-propyl, iso-propyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

The term "alkenyl," as used herein, denotes a monovalent group derived from a straight- or branched-chain aliphatic moiety having at least one carbon-carbon double bond by the removal of a single hydrogen atom. Unless otherwise specified, alkenyl groups contain 2-12 carbon atoms. In certain embodiments, alkenyl groups contain 2-8 carbon atoms. In certain embodiments, alkenyl groups contain 2-6 carbon atoms. In some embodiments, alkenyl groups contain 2-5 carbon atoms, in some embodiments, alkenyl groups contain 2-4 carbon atoms, in yet other embodiments alkenyl groups contain 2-3 carbon atoms, and in yet other embodiments alkenyl groups contain 2 carbon atoms. Alkenyl groups include, for example, ethenyl, propenyl, butenyl, 1-methyl-2-buten-1-yl, and the like.

The term "alkynyl," as used herein, refers to a monovalent group derived from a straight- or branched-chain aliphatic moiety having at least one carbon-carbon triple bond by the removal of a single hydrogen atom. Unless otherwise specified, alkynyl groups contain 2-12 carbon atoms. In certain embodiments, alkynyl groups contain 2-8 carbon atoms. In certain embodiments, alkynyl groups contain 2-6 carbon atoms. In some embodiments, alkynyl groups contain 2-5 carbon atoms, in some embodiments, alkynyl groups contain 2-4 carbon atoms, in yet other embodiments alkynyl groups contain 2-3 carbon atoms, and in yet other embodiments alkynyl groups contain 2 carbon atoms. Representative alkynyl groups include, but are not limited to, ethynyl, 2-propynyl (propargyl), 1-propynyl, and the like.

The term "aryl" used alone or as part of a larger moiety as in "aralkyl", "araliphatic", "aralkoxy", or "aryloxyalkyl", refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring". In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenantriidinyl, or tetrahydronaphthyl, and the like.

The terms "heteroaryl" and "heteroar-", used alone or as part of a larger moiety, e.g., "heteroaralkyl", or "heteroaralkoxy", refer to groups having 5 to 14 ring atoms, preferably 5, 6, or 9 ring atoms; having 6, 10, or 14 π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, benzofuranyl and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3 (4H)-one. A heteroaryl group may be mono- or bicyclic. The term "heteroaryl" may be used interchangeably with the terms "heteroaryl ring", "heteroaryl group", or "heteroaromatic", any of which terms include rings that are optionally substituted. The term "heteroaralkyl" refers to an alkyl group substituted by a heteroaryl, wherein the alkyl and heteroaryl portions independently are optionally substituted.

As used herein, the terms "heterocycle", "heterocyclyl", "heterocyclic radical", and "heterocyclic ring" are used interchangeably and refer to a stable 5- to 7-membered monocyclic or 7-14-membered polycyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or $^+$NR (as in N-substituted pyrrolidinyl).

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle", "heterocyclyl", "heterocyclyl ring", "heterocyclic group", "heterocyclic moiety", and "heterocyclic radical", are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

As described herein, compounds of the invention may contain "optionally substituted" moieties. In general, the term "substituted", whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen; —$(CH_2)_{0-4}R^\circ$; —$(CH_2)_{0-4}R^\circ$; —O—$(CH_2)_{0-4}C(O)$ OR°; —(CH₂)₀₋₄CH(OR°)₂; —(CH₂)₀₋₄SR°; —(CH₂)₀₋₄Ph, which may be substituted with R°; —(CH₂)₀₋₄O(CH₂)₀₋₁Ph which may be substituted with R°; —CH=CHPh, which may be substituted with R°; —NO₂; —CN; —N₃; —(CH₂)₀₋₄N(R°)₂; —(CH₂)₀₋₄N(R°)C(O)R°; —N(R°)C(S)R°; —(CH₂)₀₋₄N(R°)C(O)NR°₂; —N(R°)C(S)NR°₂; —(CH₂)₀₋₄N(R°)C(O)OR°; —N(R°)N(R°)C(O)R°; —N(R°)N(R°)C(O)NR°₂; —N(R°)N(R°)C(O)OR°; —(CH₂)₀₋₄C(O)R°; —C(S)R°; —(CH₂)₀₋₄C(O)OR°; —(CH₂)₀₋₄C(O)N(R°)₂; —(CH₂)₀₋₄C(O)SR°; —(CH₂)₀₋₄C(O)OSiR°₃; —(CH₂)₀₋₄OC(O)R°; —OC(O)(CH₂)₀₋₄SR—, SC(S)SR°; —(CH₂)₀₋₄SC(O)R°; —(CH₂)₀₋₄C(O)NR°₂; —C(S)NR°₂; —C(S)SR°; —SC(S)SR°, —(CH₂)₀₋₄OC(O)NR°₂; —C(O)N(OR°)R°; —C(O)C(O)R°; —C(O)CH₂C(O)R°; —C(NOR°)R°; —(CH₂)₀₋₄SSR°; —(CH₂)₀₋₄S(O)₂R°; —(CH₂)₀₋₄S(O)₂OR°; —(CH₂)₀₋₄OS(O)₂R°; —S(O)₂NR°₂; —(CH₂)₀₋₄S(O)R°; —N(R°)S(O)₂NR°₂; —N(R°)S(O)₂R°; —N(OR°)R°; —C(NH)NR°₂; —P(O)₂R°; —P(O)R°₂; —OP(O)R°₂; —OP(O)(OR°₂; SiR°₃; —(C₁₋₄ straight or branched alkylene)O—N(R°)₂; or —(C₁₋₄ straight or branched)alkylene)C(O)O—N(R°)₂, wherein each R° may be substituted as defined below and is independently hydrogen, C₁₋₈ aliphatic, —CH₂Ph, —(CH₂)₀₋₁Ph, or a 5-6-membered saturated, partially unsaturated, or aryl ring having 0-4 heteroatoms independently selected from nitrogen, oxygen, or sulfur, or, notwithstanding the definition above, two independent occurrences of R°, taken together with their intervening atom(s), form a 3-12-membered saturated, partially unsaturated, or aryl mono- or polycyclic ring having 0-4 heteroatoms independently selected from nitrogen, oxygen, or sulfur, which may be substituted as defined below.

Suitable monovalent substituents on R° (or the ring formed by taking two independent occurrences of R° together with their intervening atoms), are independently halogen, —(CH₂)₀₋₂R•, —(haloR•), —(CH₂)₀₋₂OH, —(CH₂)₀₋₂OR•, —(CH₂)₀₋₂CH(OR•)₂; —O(haloR•), —CN, —N₃, —(CH₂)₀₋₂C(O)R•, —(CH₂)₀₋₂C(O)OH, —(CH₂)₀₋₂C(O)OR•, —(CH₂)₀₋₄C(O)N(R°)₂; —(CH₂)₀₋₂SR•, —(CH₂)₀₋₂SH, —(CH₂)₀₋₂NH₂, —(CH₂)₀₋₂NHR•, —(CH₂)₀₋₂NR•₂, —NO₂, —SiR•₃, —OSiR•₃, —C(O)SR•, —(C₁₋₄ straight or branched alkylene)C(O)OR•, or —SSR• wherein each R• is unsubstituted or where preceded by "halo" is substituted only with one or more halogens, and is independently selected from C₁₋₄ aliphatic, —CH₂Ph, —O(CH₂)₀₋₁Ph, or a 5-6-membered saturated, partially unsaturated, or aryl ring having 0-4 heteroatoms independently selected from nitrogen, oxygen, or sulfur. Suitable divalent substituents on a saturated carbon atom of R° include =O and =S.

Suitable divalent substituents on a saturated carbon atom of an "optionally substituted" group include the following: =O, =S, =NNR*₂, =NNHC(O)R*, =NNHC(O)OR*, =NNHS(O)₂R*, =NR*, =NOR*, —O(C(R*₂))₂₋₃O— or —S(C(R*₂))₂₋₃S—, wherein each independent occurrence of R* is selected from hydrogen, C₁₋₆ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*₂)₂₋₃O—, wherein each independent occurrence of R* is selected from hydrogen, C₁₋₆ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R•, —(haloR•), —OH, —OR•, —O(haloR•), —CN, —C(O)OH, —C(O)OR•, —NH₂, —NHR•, —NR•₂, or —NO₂, wherein each R• is unsubstituted or where preceded by "halo" is substituted only with one or more halogens, and is independently C₁₋₄ aliphatic, —CH₂Ph, —O(CH₂)₀₋₁Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R†, —NR†₂, —C(O)R†, —C(O)OR†, —C(O)C(O)R†, —C(O)CH₂C(O)R†, —S(O)₂R†, —S(O)₂NR†₂, —C(S)NR†₂, —C(NH)NR†₂, or —N(R†)S(O)₂R†; wherein each R† is independently hydrogen, C₁₋₆ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R†, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of R† are independently halogen, —R•, —(haloR•), —OH, —OR•, —O(haloR•), —CN, —C(O)OH, —C(O)OR•, —NH₂, —NHR•, —NR•₂, or —NO₂, wherein each R• is unsubstituted or where preceded by "halo" is substituted only with one or more halogens, and is independently C₁₋₄ aliphatic, —CH₂Ph, —O(CH₂)₀₋₁Ph, or a 5-6-membered saturated, partially unsaturated, or aryl ring having 0-4 heteroatoms independently selected from nitrogen, oxygen, or sulfur.

As used herein, the term "tautomer" includes two or more interconvertible compounds resulting from at least one formal migration of a hydrogen atom and at least one change in valency (e.g., a single bond to a double bond, a triple bond to a single bond, or vice versa). The exact ratio of the tautomers depends on several factors, including temperature, solvent, and pH. Tautomerizations (i.e., the reaction providing a tautomeric pair) may be catalyzed by acid or base. Exemplary tautomerizations include keto-to-enol; amide-to-imide; lactam-to-lactim; enamine-to-imine; and enamine-to-(a different) enamine tautomerizations.

As used herein, the "term head-to-tail" or "HT", refers to the regiochemistry of adjacent repeating units in a polymer chain. For example, in the context of poly(propylene carbonate) (PPC), the term head-to-tail based on the three regiochemical possibilities depicted below:

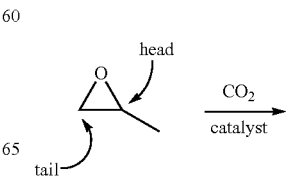

-continued

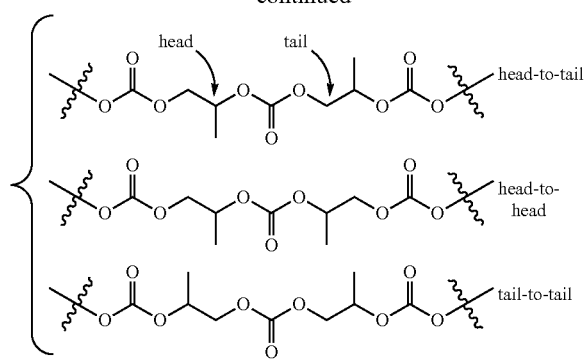

The term head-to-tail ratio (H:T) refers to the proportion of head-to-tail linkages to the sum of all other regiochemical possibilities. With respect to the depiction of polymer structures, while a specific regiochemical orientation of monomer units may be shown in the representations of polymer structures herein, this is not intended to limit the polymer structures to the regiochemical arrangement shown but is to be interpreted to encompass all regiochemical arrangements including that depicted, the opposite regiochemistry, random mixtures, isotactic materials, syndiotactic materials, racemic materials, and/or enantioenriched materials and combinations of any of these unless otherwise specified.

As used herein the term "alkoxylated" means that one or more functional groups on a molecule (usually the functional group is an alcohol, amine, or carboxylic acid, but is not strictly limited to these) has appended to it a hydroxy-terminated alkyl chain. Alkoxylated compounds may comprise a single alkyl group or they may be oligomeric moieties such as hydroxyl-terminated polyethers. Alkoxylated materials can be derived from the parent compounds by treatment of the functional groups with epoxides.

DETAILED DESCRIPTION OF CERTAIN EMBODIMENTS

The present invention encompasses polymer compositions comprising aliphatic polycarbonate chains containing epoxy functional groups. In certain embodiments, aliphatic polycarbonate chains comprise epoxy functional groups capable of participating in epoxide ring opening reactions with nucleophiles.

I) Aliphatic Polycarbonate Chains with Epoxy End-Groups.

In certain embodiments, the present invention encompasses polymer compositions containing aliphatic polycarbonate polymers comprising epoxy groups at one or more chain ends. In certain embodiments, these epoxy groups are introduced by modifying hydroxyl end-groups on aliphatic polycarbonate chains in a post-polymerization step.

In certain embodiments, the aliphatic polycarbonate chains containing at least one hydroxyl end-group are chemically modified in a post-polymerization reaction to introduce epoxide functional groups:

Scheme 1

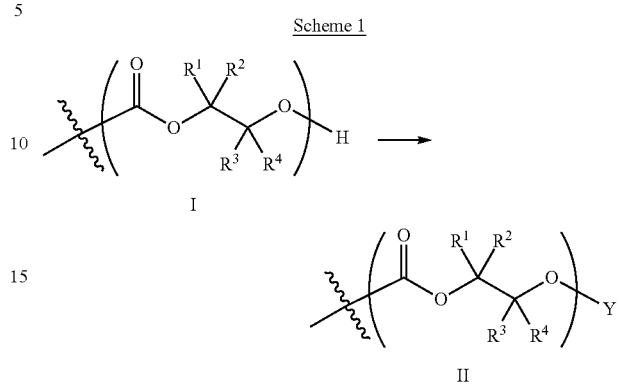

This is represented by Scheme 1, where structure I represents a portion of an aliphatic polycarbonate chain (each chain may have more than one such end) and structure II represents a modified analog of I with an epoxide-containing moiety Y, where $R^1$, $R^2$, $R^3$, and $R^4$ are, at each occurrence in the polymer chain, independently selected from the group consisting of —H, fluorine, an optionally substituted $C_{1-40}$ aliphatic group, and an optionally substituted $C_{1-20}$ heteroaliphatic group, and an optionally substituted aryl group, where any two or more of $R^1$, $R^2$, $R^3$, and $R^4$ may optionally be taken together with intervening atoms to form one or more optionally substituted rings optionally containing one or more heteroatoms.

In certain embodiments, Y in structure II represents an epoxy substituted alkyl group. In certain embodiments, such a compound has a formula IIa:

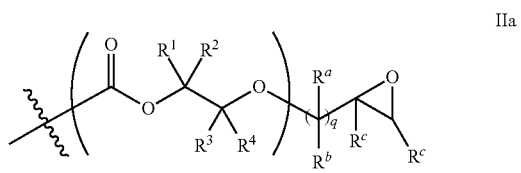

where $R^1$, $R^2$, $R^3$, and $R^4$ are as defined above;

$R^a$, and $R^b$, are, at each occurrence, independently selected from the group consisting of —H, halogen, an optionally substituted $C_{1-20}$ aliphatic group, an optionally substituted $C_{1-20}$ heteroaliphatic group, an optionally substituted acyloxy group, an optionally substituted acyl group, an optionally substituted alkoxy group, an optionally substituted carbocyclic group, and an optionally substituted heterocyclic group, where any two or more $R^a$ and $R^b$ groups may optionally be taken together with intervening atoms to form one or more optionally substituted rings optionally containing one or more heteroatoms;

R$^c$, is at each occurrence, independently selected from the group consisting of —H, an optionally substituted C$_{1-20}$ aliphatic group, an optionally substituted C$_{1-20}$ heteroaliphatic group, an optionally substituted carbocyclic group, and an optionally substituted heterocyclic group, where any two or more Re groups may optionally be taken together with intervening atoms to form one or more optionally substituted rings optionally containing one or more heteroatoms; and q is from 1 to 10 inclusive.

In certain embodiments, compounds of formula IIa are selected from the group consisting of:

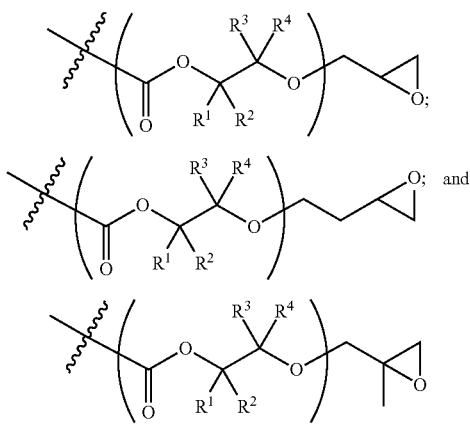

wherein R$^1$, R$^2$, R$^3$, and R$^4$ are as defined above and described in classes and subclasses herein;

In certain embodiments, polymer compositions of the present invention comprise aliphatic polycarbonate chains containing one or more moieties IIa-1:

IIa-1

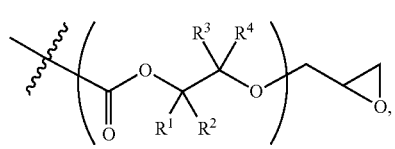

wherein R$^1$, R$^2$, R$^3$, and R$^4$ are as defined above and described in classes and subclasses herein.

In certain embodiments, polymer compositions of the present invention comprise aliphatic polycarbonate chains containing one or more moieties IIa-2:

IIa-2

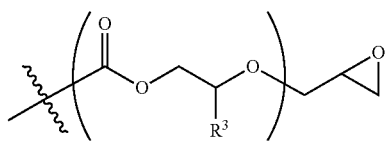

wherein R$^3$ is as defined above and described in classes and subclasses herein.

In certain embodiments, polymer compositions of the present invention comprise aliphatic polycarbonate chains containing one or more moieties IIa-3:

IIa-3

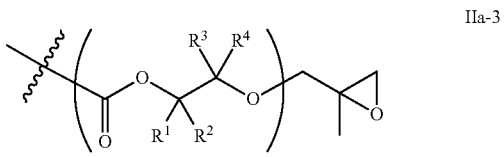

wherein R$^1$, R$^2$, R$^3$, and R$^4$ are as defined above and described in classes and subclasses herein.

In certain embodiments, polymer compositions of the present invention comprise aliphatic polycarbonate chains containing one or more moieties IIa-4:

IIa-4

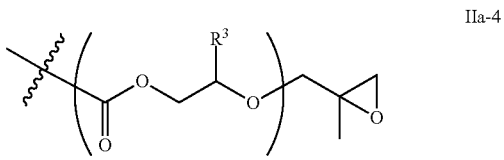

wherein R$^3$ is as defined above and described in classes and subclasses herein.

In other embodiments, Y in structure II comprises a carbamate group. In certain embodiments, such carbamates have a formula IIb:

IIb

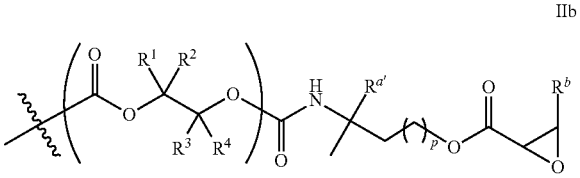

where R$^1$, R$^2$, R$^3$, R$^4$, and R$^b$ are as defined above and described in classes and subclasses herein;

p is from 1 to 12 inclusive, and

R$^{a'}$ represents one or more optionally present substituents which, if present, is each independently selected from the group consisting of halogen, an optionally substituted C$_{1-20}$ aliphatic group, an optionally substituted C$_{1-20}$ heteroaliphatic group, an optionally substituted carbocyclic group, and an optionally substituted heterocyclic group, where when more than one R$^{a'}$ group is present, two or more of them may optionally be taken together with intervening atoms to form one or more optionally substituted rings optionally containing one or more heteroatoms.

In certain embodiments, carbamate derivatives of formula IIb are selected from the group consisting of:

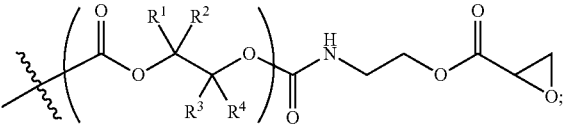

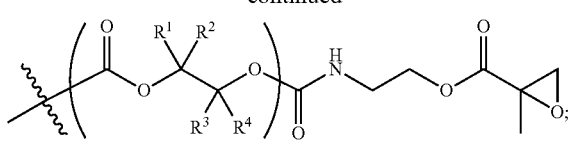
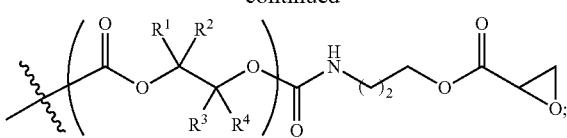
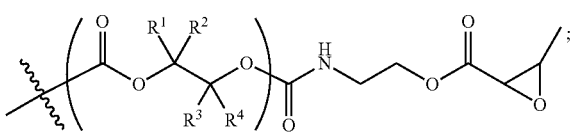
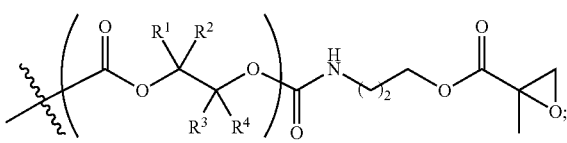
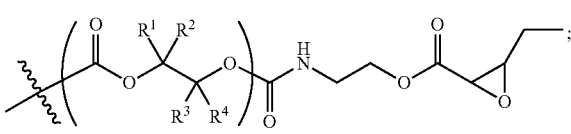
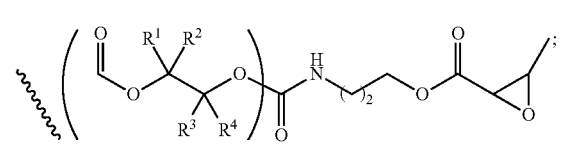
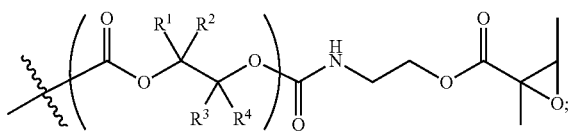
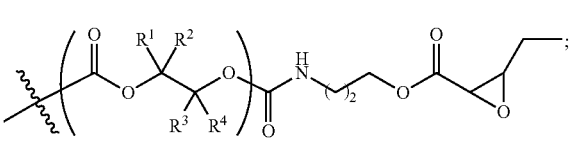
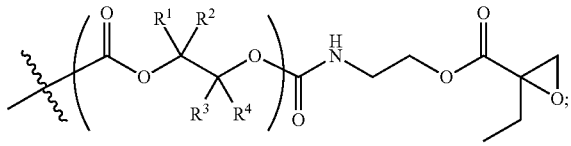
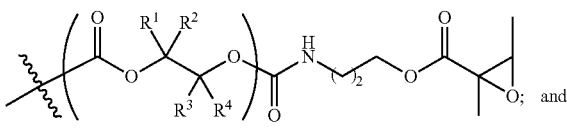
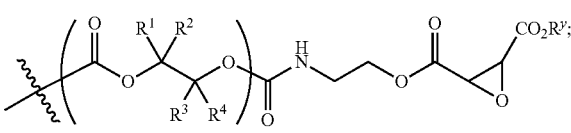
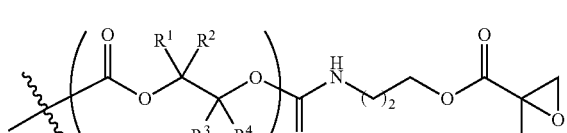
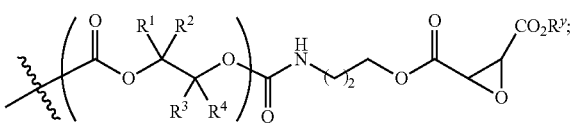
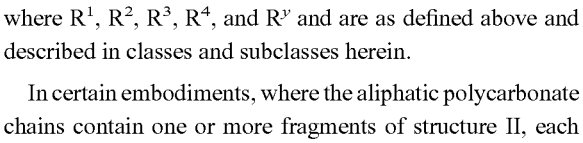
where $R^1$, $R^2$, $R^3$, $R^4$, and $R^y$ and are as defined above and described in classes and subclasses herein.
In certain embodiments, where the aliphatic polycarbonate chains contain one or more fragments of structure II, each polymer chain contains, on average, at least two such frag ments. In certain embodiments, such polymers have a structure P1:

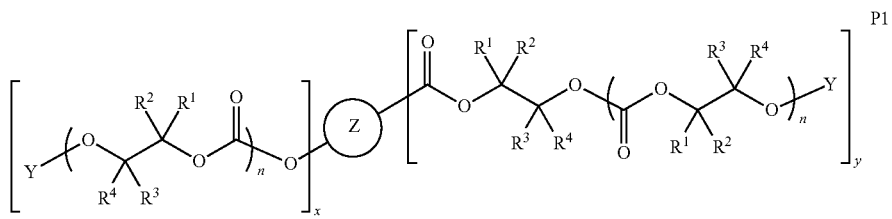

wherein $R^1$, $R^2$, $R^3$, $R^4$, and Y are as defined above and described in classes and subclasses herein;

is a multivalent moiety;

n is independently at each occurrence from 2 to 1000; and x and y are each independently from 0 to 6, where the sum of x and y is between 2 and 6, inclusive.

In certain embodiments, such polycarbonate chains have two ends each terminated with a —Y group as defined hereinabove. In certain embodiments, these —Y groups are the same at each occurrence and are derived by post-polymerization reactions on the hydroxy end groups of a polycarbonate chain.

In certain embodiments, the multivalent moiety

embedded within the aliphatic polycarbonate chain is derived from a polyfunctional chain transfer agent having two or more sites from which epoxide/$CO_2$ copolymerization can occur. In certain embodiments, the multivalent moiety

comprises one or more atoms selected from the group consisting of carbon, nitrogen, phosphorous, sulfur and boron. In certain embodiments,

comprises one or more carbon atoms. In certain embodiments,

comprises a phosphorous atom. In certain embodiments,

comprises a polymer chain.

In certain embodiments,

is derived from any of the polyfunctional chain transfer agents as exemplified in published PCT application WO 2010/028362 the entirety of which is incorporated herein by reference.

In certain embodiments, the polyfunctional chain transfer agent has a formula:

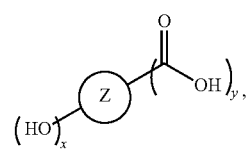

where x, and y are as defined above and described in classes and subclasses herein.

In certain embodiments, aliphatic polycarbonate chains in the inventive polymer compositions are derived from the copolymerization of one or more epoxides with carbon dioxide in the presence of such polyfunctional chain transfer agents as shown in scheme 2:

Scheme 2

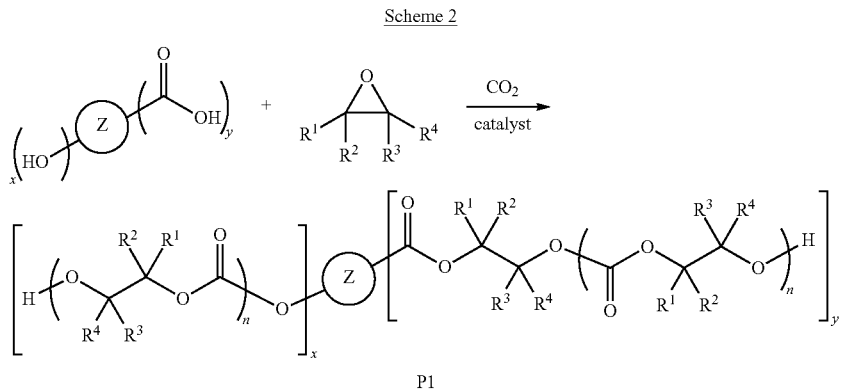

In certain embodiments, the aliphatic polycarbonate chains in polymer compositions of the present invention comprise chains with the structure P2:

P2

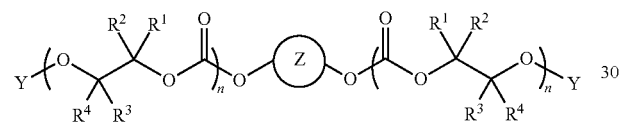

where $R^1$, $R^2$, $R^3$, $R^4$, Y,

and n are as defined above and described in classes and subclasses herein.

In certain embodiments, where the aliphatic polycarbonate chains have a structure P2, the moiety

is derived from a dihydric alcohol. In such instances the moiety

represents the carbon-containing backbone of the dihydric alcohol, while the two oxygen atoms adjacent to

are derived from the —OH groups of the diol. For example, if the dihydric alcohol were derived from ethylene glycol, then

would be —$CH_2CH_2$— and P2 would have the following structure:

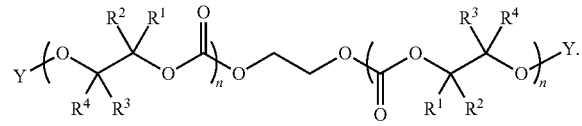

In certain embodiments, where

is derived from a dihydric alcohol, the dihydric alcohol comprises a $C_{2-40}$ diol. In certain embodiments, the dihydric alcohol is selected from the group consisting of: 1,2-ethanediol, 1,2-propanediol, 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, isosorbide, glycerol monoesters, glycerol monoethers, trimethylolpropane monoesters, trimethylolpropane monoethers, pentaerythritol diesters, pentaerythritol diethers and alkoxylated derivatives of any of these.

In certain embodiments, where

is derived from a dihydric alcohol, the dihydric alcohol is selected from the group consisting of: diethylene glycol, triethylene glycol, tetraethylene glycol, higher poly(ethylene glycol), such as those having number average molecular weights of from 220 to about 2000 g/mol, dipropylene glycol, tripropylene glycol, and higher poly(propylene glycols) such as those having number average molecular weights of from 234 to about 2000 g/mol.

In certain embodiments, where $$\text{\textcircled{Z}}$$

is derived from a dihydric alcohol, the dihydric alcohol comprises an alkoxylated derivative of a compound selected from the group consisting of: a diacid, a diol, or a hydroxy acid. In certain embodiments, the alkoxylated derivatives comprise ethoxylated or propoxylated compounds.

In certain embodiments, where $$\text{\textcircled{Z}}$$

is derived from a dihydric alcohol, the dihydric alcohol comprises a polymeric diol. In certain embodiments, a polymeric diol is selected from the group consisting of polyethers, polyesters, hydroxy-terminated polyolefins, polyether-copolyesters, polyether polycarbonates, polycarbonate-copolyesters, and alkoxylated analogs of any of these. In certain embodiments, the polymeric diol has an average molecular weight less than about 2000 g/mol.

In certain embodiments, $$\text{\textcircled{Z}}$$

is derived from a polyhydric alcohol with more than two hydroxy groups. In certain embodiments, the aliphatic polycarbonate chains in polymer compositions of the present invention comprise aliphatic polycarbonate chains where the moiety $$\text{\textcircled{Z}}$$

is derived from a triol. In certain embodiments, such aliphatic polycarbonate chains have the structure P3:

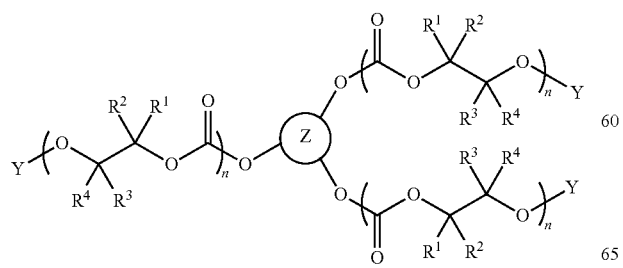

P3 where $R^1$, $R^2$, $R^3$, $R^4$, Y, $$\text{\textcircled{Z}}$$

and n are as defined above and described in classes and subclasses herein.

In certain embodiments, where $$\text{\textcircled{Z}}$$

is derived from a triol, the triol is selected from the group consisting of: glycerol, 1,2,4-butanetriol, 2-(hydroxymethyl)-1,3-propanediol; hexane triols, trimethylol propane, trimethylol ethane, trimethylolhexane, 1,4-cyclohexanetrimethanol, pentaerythritol mono esters, pentaerythritol mono ethers, and alkoxylated analogs of any of these. In certain embodiments, the alkoxylated derivatives comprise ethoxylated or propoxylated compounds.

In certain embodiments, $$\text{\textcircled{Z}}$$

is derived from an alkoxylated derivative of a trifunctional carboxylic acid or trifunctional hydroxy acid. In certain embodiments, the alkoxylated polymeric derivatives comprise ethoxylated or propoxylated compounds.

In certain embodiments, where $$\text{\textcircled{Z}}$$

is derived from a polymeric triol, the polymeric triol is selected from the group consisting of polyethers, polyesters, hydroxy-terminated polyolefins, polyether-copolyesters, polyether polycarbonates, polycarbonate-copolyesters, and alkoxylated analogs of any of these. In certain embodiments, the alkoxylated polymeric triols comprise ethoxylated or propoxylated compounds.

In certain embodiments, $$\text{\textcircled{Z}}$$

is derived from a polyhydric alcohol with four hydroxy groups. In certain embodiments, aliphatic polycarbonate chains in polymer compositions of the present invention comprise aliphatic polycarbonate chains where the moiety $$\text{\textcircled{Z}}$$

is derived from a tetraol. In certain embodiments, aliphatic polycarbonate chains in polymer compositions of the present invention comprise chains with the structure P4:

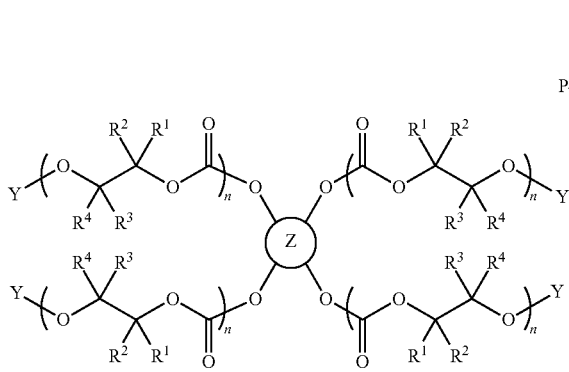

where $R^1$, $R^2$, $R^3$, $R^4$, Y,

and n are as defined above and described in classes and subclasses herein.

In certain embodiments,

is derived from a polyhydric alcohol with more than four hydroxy groups. In certain embodiments,

is derived from a polyhydric alcohol with six hydroxy groups. In certain embodiments, the polyhydric alcohol is dipentaerithrotol or an alkoxylated analog thereof. In certain embodiments, the aliphatic polycarbonate chains in polymer compositions of the present invention comprise chains with the structure P5:

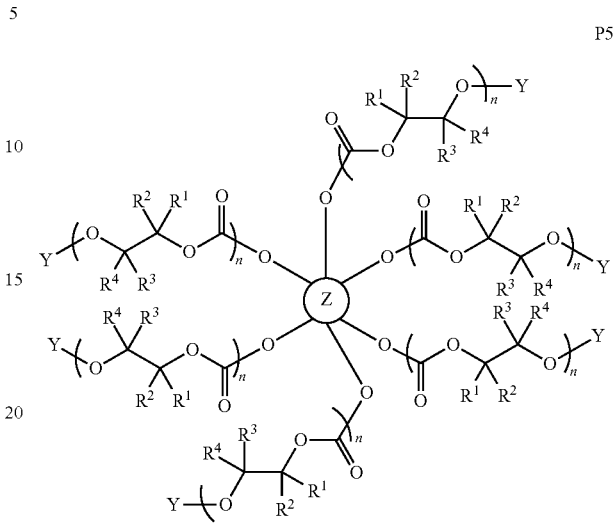

where $R^1$, $R^2$, $R^3$, $R^4$, Y,

and n are as defined above and described in classes and subclasses herein.

In certain embodiments, aliphatic polycarbonates of the present invention comprise a combination of bifunctional chains (e.g. polycarbonates of formula P2) in combination with higher functional chains (e.g. one or more polycarbonates of formulae P3 to P5).

In certain embodiments,

is derived from a hydroxy acid. In certain embodiments, aliphatic polycarbonate chains in polymer compositions of the present invention comprise chains with the structure P6:

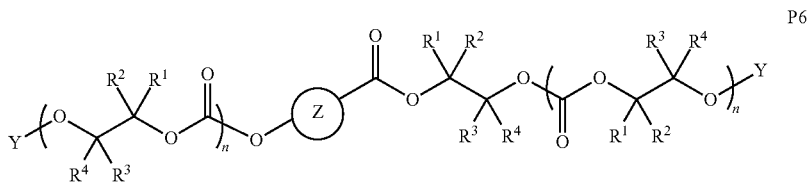

where $R^1$, $R^2$, $R^3$, $R^4$, Y,

and n are as defined above and described in classes and subclasses herein.

In such instances,

represents the carbon-containing backbone of the hydroxy acid, while ester and carbonate linkages adjacent to are

derived from the —$CO_2H$ group and the hydroxy group of the hydroxy acid. For example, if

were derived from 3-hydroxy propanoic acid, then ⊙ would be —$CH_2CH_2$— and P6 would have the following structure:

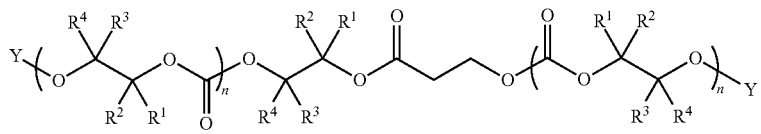

where $R^1$, $R^2$, $R^3$, $R^4$, Y, and n are as defined above and described in classes and subclasses herein.

In certain embodiments,

is derived from an optionally substituted $C_{2-40}$ hydroxy acid. In certain embodiments,

is derived from a polyester. In certain embodiments, such polyesters have a molecular weight less than about 2000 g/mol.

In certain embodiments, a hydroxy acid is an alpha-hydroxy acid. In certain embodiments, a hydroxy acid is selected from the group consisting of: glycolic acid, DL-lactic acid, D-lactic acid, L-lactic, citric acid, and mandelic acid.

In certain embodiments, a hydroxy acid is a beta-hydroxy acid. In certain embodiments, a hydroxy acid is selected from the group consisting of: 3-hydroxypropionic acid, DL 3-hydroxybutryic acid, D-3 hydroxybutryic acid, L 3-hydroxybutyric acid, DL-3-hydroxy valeric acid, D-3-hydroxy valeric acid, L-3-hydroxy valeric acid, salicylic acid, and derivatives of salicylic acid.

In certain embodiments, the hydroxy acid is a α-ω hydroxy acid. In certain embodiments, the hydroxy acid is selected from the group consisting of: optionally substituted $C_{3-20}$ aliphatic α-ω hydroxy acids and oligomeric esters.

In certain embodiments,

is derived from a hydroxy acid selected from the group consisting of:

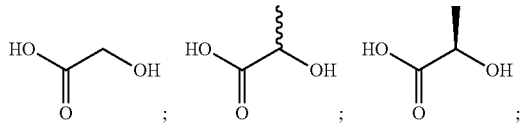

-continued

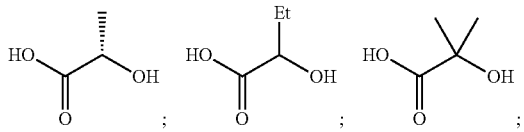

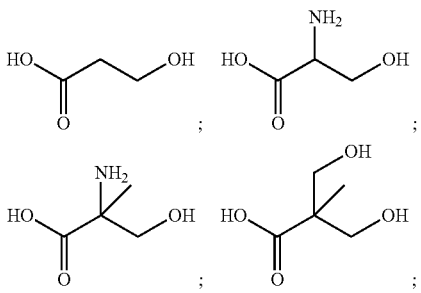

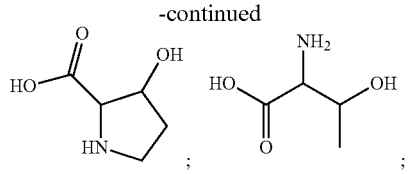
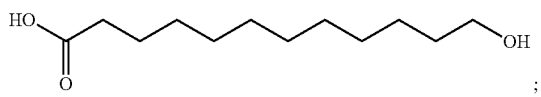
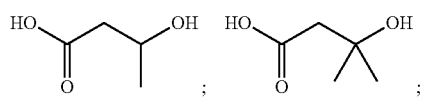
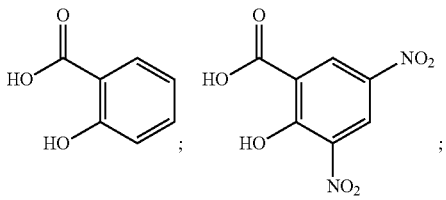
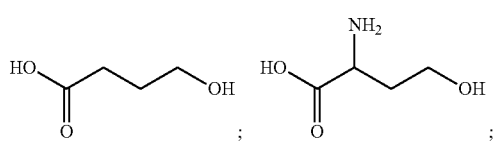
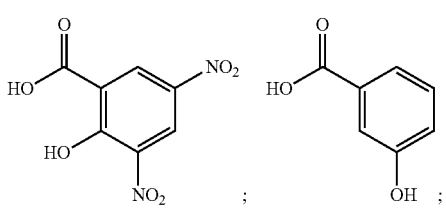
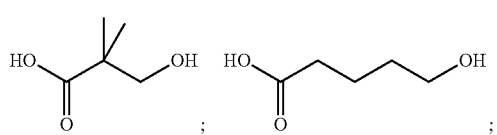
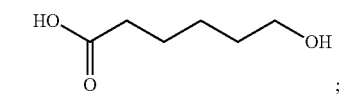
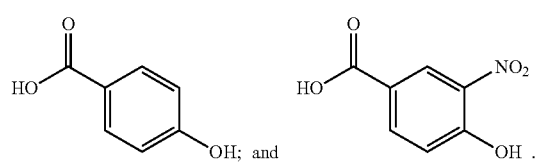
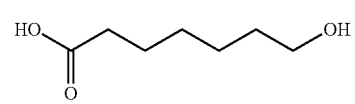
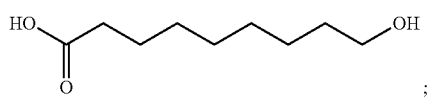
In certain embodiments,
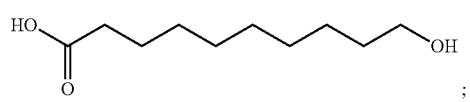
is derived from a polycarboxylic acid. In certain embodiments, the aliphatic polycarbonate chains in polymer compositions of the present invention comprise chains with the structure P7:
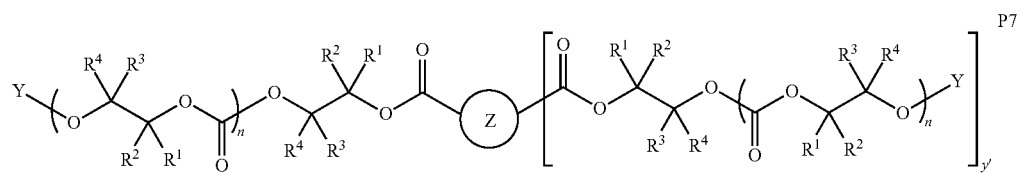

where $R^1$, $R^2$, $R^3$, $R^4$, Y,

and n are as defined above and described in classes and subclasses herein, and y' is from 1 to 5, inclusive.

In embodiments where the aliphatic polycarbonate chains have a structure P7,

represents the carbon-containing backbone (or a bond in the case of oxalic acid) of the polycarboxylic acid, while the ester groups adjacent to

are derived from the —$CO_2H$ groups of the polycarboxylic acid. For example, if

were derived from succinic acid ($HO_2CCH_2CH_2CO_2H$), then ⊙ would be —$CH_2CH_2$— and P7 would have the following structure:

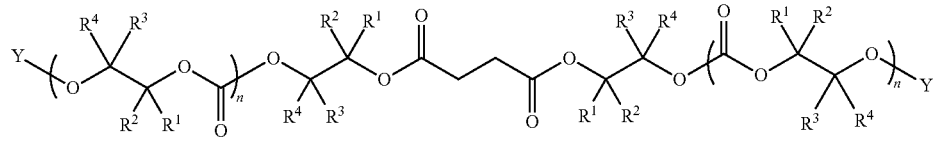

where $R^1$, $R^2$, $R^3$, $R^4$, Y, and n are as defined above.

In certain embodiments,

is derived from a dicarboxylic acid. In certain embodiments, the aliphatic polycarbonate chains in polymer compositions of the present invention comprise chains with the structure P8:

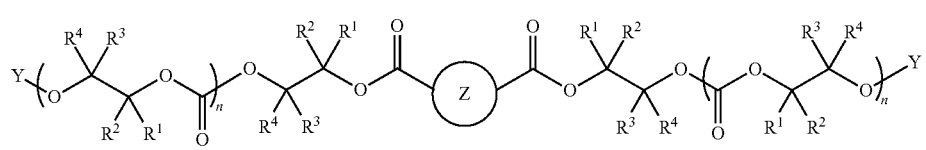

where $R^1$, $R^2$, $R^3$, $R^4$, Y,

and n are as defined above.

In certain embodiments,

is derived from a dicarboxylic acid selected from the group consisting of: phthalic acid, isophthalic acid, terephthalic acid, maleic acid, succinic acid, malonic acid, glutaric acid, adipic acid, pimelic acid, suberic acid, and azelaic acid.

In certain embodiments,

derived from a dicarboxylic acid selected from the group consisting of:

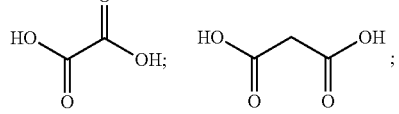

-continued

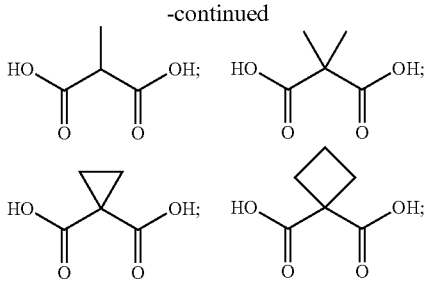

P8

-continued

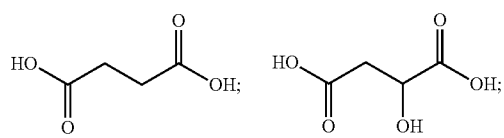
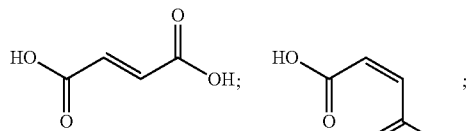
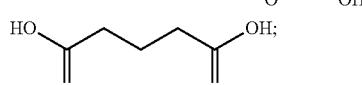
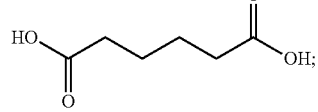
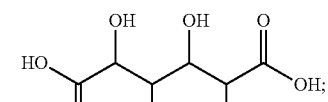
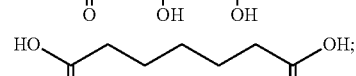
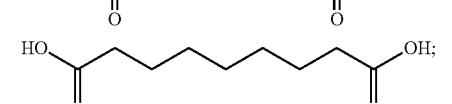
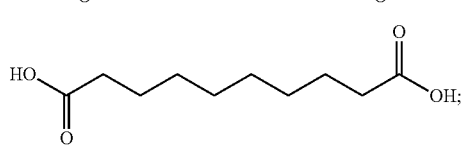
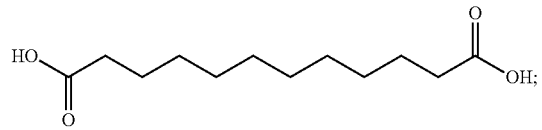
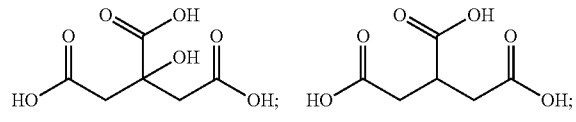
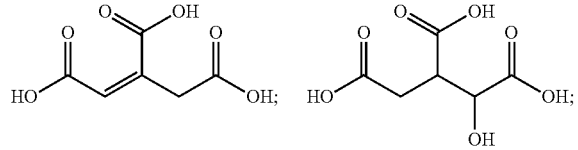
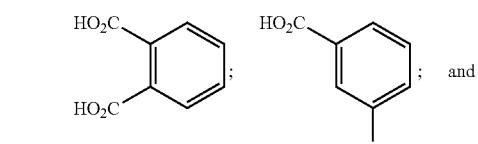
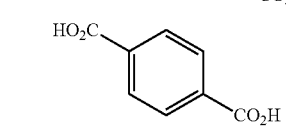

and

In certain embodiments,

is derived from a phosphorous-containing molecule. In certain embodiments,

has a formula —P(O)(OR)$_k$— where each R is independently an optionally substituted C1-20 aliphatic group or an optionally substituted aryl group and k is 0, 1, or 2. In certain embodiments,

is derived from a phosphorous-containing molecule selected from the group consisting of:

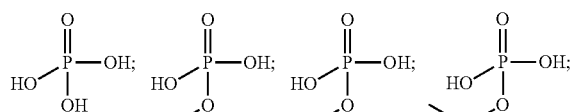
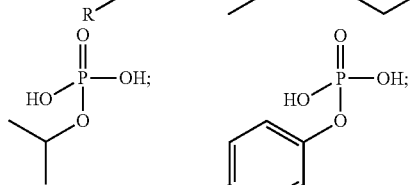
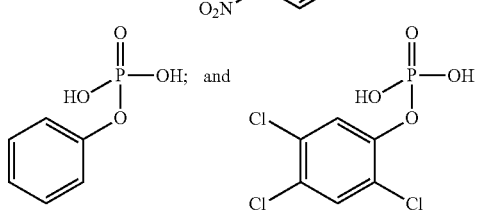

In certain embodiments,

has a formula —P(O)(R)— where R is an optionally substituted C$_{1-20}$ aliphatic group or an optionally substituted aryl group and k is 0, 1, or 2. In certain embodiments,

is derived from a phosphorous-containing molecule selected from the group consisting of:

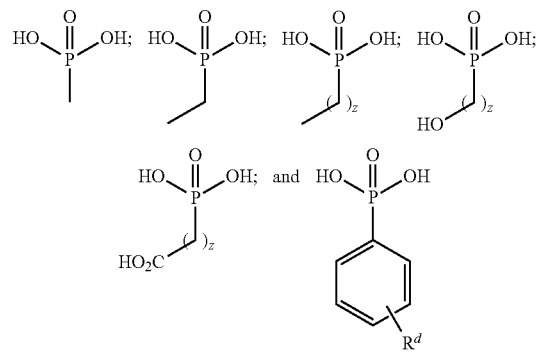

z = 2-30 where $R^d$ is as defined above.

In certain embodiments, in aliphatic polycarbonate chains of any of formulae P1 through P8, a majority of the polymer chain ends comprise —Y groups. In certain embodiments, in aliphatic polycarbonate chains of any of structures P1 through P8, a majority of the polymer chain ends comprise —Y groups capable of participating in epoxide ring-opening reactions. In certain embodiments, at least 75% of the polymer chain ends comprise —Y groups capable of participating in epoxide ring-opening reactions. In certain embodiments, at least 80% of the polymer chain ends comprise —Y groups capable of participating in epoxide ring-opening reactions. In certain embodiments, at least 85% of the polymer chain ends comprise —Y groups capable of participating in epoxide ring-opening reactions. In certain embodiments, at least 90% of the polymer chain ends comprise —Y groups capable of participating in epoxide ring-opening reactions. In certain embodiments, at least 95% of the polymer chain ends comprise —Y groups capable of participating in epoxide ring-opening reactions.

In certain embodiments, the moiety

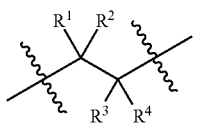

in the structures hereinabove, is at each occurrence in the aliphatic polycarbonate chains, independently selected from the group consisting of:

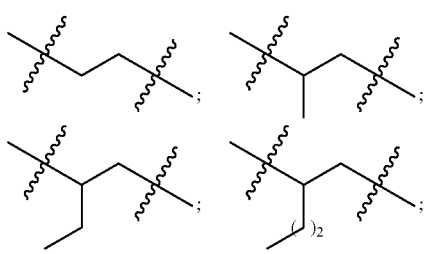

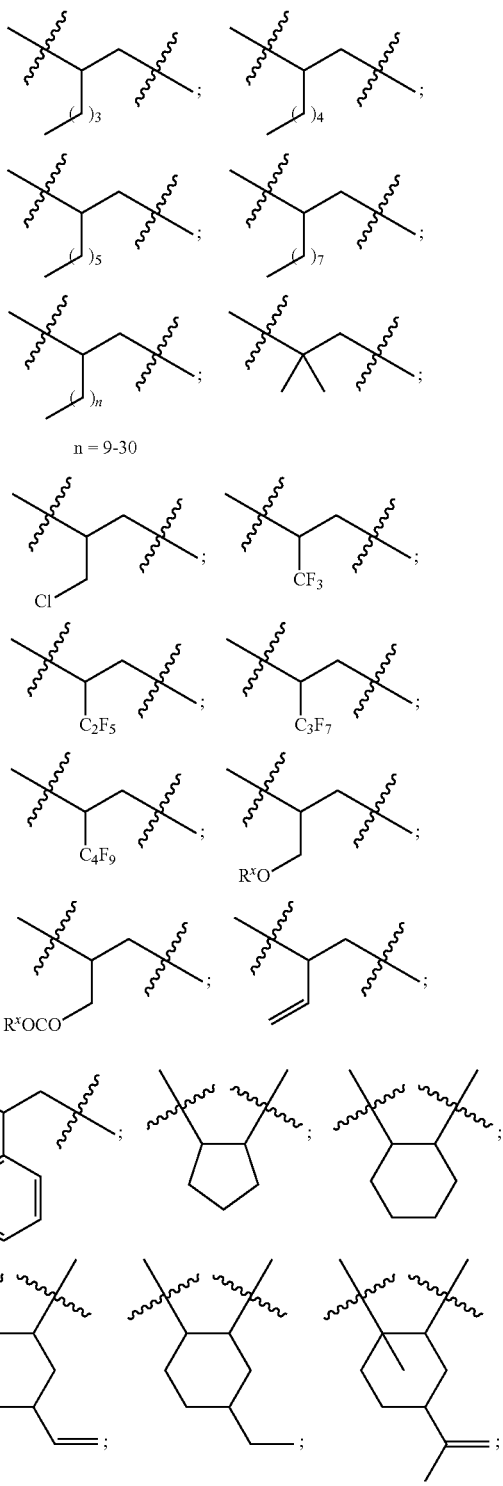

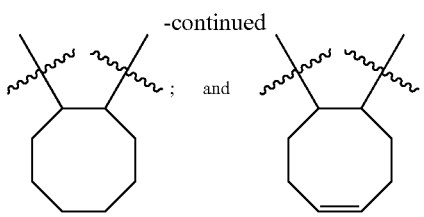

wherein each $R^x$ is independently selected from the group consisting of: optionally substituted aliphatic, optionally substituted heteroaliphatic, optionally substituted aryl and optionally substituted heteroaryl.

In certain embodiments, the moiety

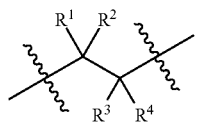

in the structures hereinabove, is at each occurrence in the aliphatic polycarbonate chains, independently selected from the group consisting of:

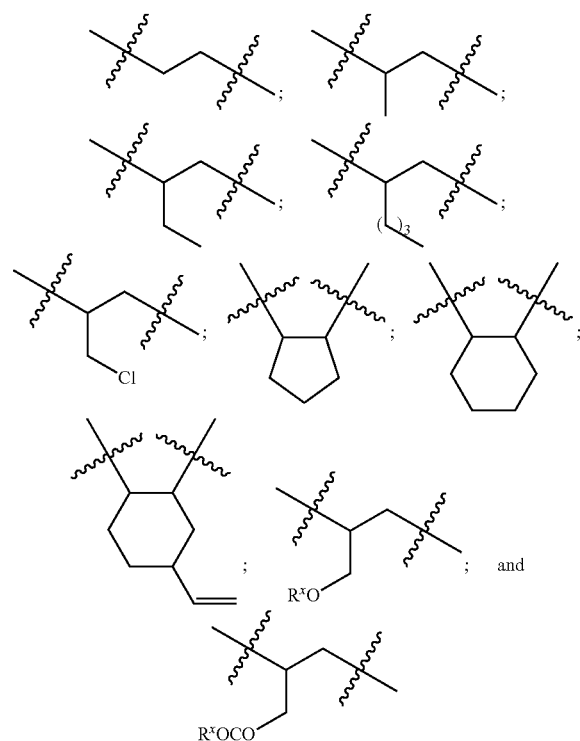

wherein $R^x$ is as defined above.

In certain embodiments, aliphatic polycarbonate chains comprise a copolymer of carbon dioxide and one epoxide. In certain embodiments, aliphatic polycarbonate chains comprise a copolymer of carbon dioxide and propylene oxide.

In certain embodiments, aliphatic polycarbonate chains comprise a copolymer of carbon dioxide and ethylene oxide.

In certain embodiments, aliphatic polycarbonate chains comprise a copolymer of carbon dioxide and cyclohexene oxide.

In certain embodiments, aliphatic polycarbonate chains comprise a copolymer of carbon dioxide and cyclopentene oxide. In certain embodiments, aliphatic polycarbonate chains comprise a copolymer of carbon dioxide and 3-vinyl cyclohexene oxide.

In other embodiments, aliphatic polycarbonate chains comprise a terpolymer of carbon dioxide and two different epoxides. In certain embodiments, aliphatic polycarbonate chains comprise a copolymer of carbon dioxide and propylene oxide along with one or more additional epoxides selected from the group consisting of ethylene oxide, 1,2-butene oxide, 2,3-butene oxide, cyclohexene oxide, 3-vinyl cyclohexene oxide, epichlorohydrin, glicydyl esters, glycidyl ethers, and epoxides of higher alpha olefins. In certain embodiments, these terpolymers contain a majority of repeat units derived from propylene oxide with lesser amounts of repeat units derived from one or more additional epoxides. In certain embodiments, the terpolymers contain about 50% to about 99.5% propylene oxide-derived repeat units. In certain embodiments, the terpolymers contain greater than 60% propylene oxide-derived repeat units. In certain embodiments, the terpolymers contain greater than 75% propylene oxide-derived repeat units. In certain embodiments, the terpolymers contain greater than 80% propylene oxide-derived repeat units. In certain embodiments, the terpolymers contain greater than 85% propylene oxide-derived repeat units. In certain embodiments, the terpolymers contain greater than 90% propylene oxide-derived repeat units. In certain embodiments, the terpolymers contain greater than 95% propylene oxide-derived repeat units.

In certain embodiments, aliphatic polycarbonate chains comprise a copolymer of carbon dioxide and ethylene oxide along with one or more additional epoxides selected from the group consisting of propylene oxide, 1,2-butene oxide, 2,3-butene oxide, cyclohexene oxide, 3-vinyl cyclohexene oxide, epichlorohydrin, glycidyl esters, glycidyl ethers, and epoxides of higher alpha olefins. In certain embodiments, these terpolymers contain a majority of repeat units derived from ethylene oxide with lesser amounts of repeat units derived from one or more additional epoxides. In certain embodiments, terpolymers contain about 50% to about 99.5% ethylene oxide-derived repeat units. In certain embodiments, terpolymers contain greater than about 60% ethylene oxide-derived repeat units. In certain embodiments, terpolymers contain greater than 75% ethylene oxide-derived repeat units. In certain embodiments, terpolymers contain greater than 80% ethylene oxide-derived repeat units. In certain embodiments, terpolymers contain greater than 85% ethylene oxide-derived repeat units. In certain embodiments, terpolymers contain greater than 90% ethylene oxide-derived repeat units. In certain embodiments, terpolymers contain greater than 95% propylene oxide-derived repeat units.

In certain embodiments, in polymer compositions described hereinabove, aliphatic polycarbonate chains have a number average molecular weight ($M_n$) in the range of 500 g/mol to about 250,000 g/mol.

In certain embodiments, aliphatic polycarbonate chains have an $M_n$ less than about 100,000 g/mol. In certain embodiments, aliphatic polycarbonate chains have an $M_n$ less than about 70,000 g/mol. In certain embodiments, aliphatic polycarbonate chains have an $M_n$ less than about 50,000 g/mol. In certain embodiments, aliphatic polycarbonate chains have an $M_n$ between about 500 g/mol and about 40,000 g/mol. In certain embodiments, aliphatic polycarbonate chains have an $M_n$ less than about 25,000 g/mol. In certain embodiments, aliphatic polycarbonate chains have an $M_n$ between about 500 g/mol and about 20,000 g/mol. In certain embodiments, aliphatic polycarbonate chains have an $M_n$ between about 1000 g/mol and about 10,000 g/mol. In certain embodiments, aliphatic polycarbonate chains have an $M_n$ between about 1,000 g/mol and about 5,000 g/mol. In certain embodiments, aliphatic polycarbonate chains have an $M_n$ of about 5,000 g/mol. In certain embodiments, aliphatic polycarbonate chains have an $M_n$ of about 4,000 g/mol. In certain embodiments, aliphatic polycarbonate chains have an $M_n$ of about 3,000 g/mol. In certain embodiments, aliphatic polycarbonate chains have an $M_n$ of about 2,500 g/mol. In certain embodiments, aliphatic polycarbonate chains have an $M_n$ of about 2,000 g/mol.

In certain embodiments, in polymer compositions described hereinabove, aliphatic polycarbonate chains are characterized in that they have a narrow molecular weight distribution. This can be indicated by the polydispersity indices (PDI) of the aliphatic polycarbonate polymers. In certain embodiments, aliphatic polycarbonate compositions have a PDI less than 2. In certain embodiments, aliphatic polycarbonate compositions have a PDI less than 1.8. In certain embodiments, aliphatic polycarbonate compositions have a PDI less than 1.5. In certain embodiments, aliphatic polycarbonate compositions have a PDI less than 1.4. In certain embodiments, aliphatic polycarbonate compositions have a PDI between about 1.0 and 1.2. In certain embodiments, aliphatic polycarbonate compositions have a PDI between about 1.0 and 1.1.

In certain embodiments, where aliphatic polycarbonates are derived from mono-substituted epoxides (e.g. such as propylene oxide, 1,2-butylene oxide, epichlorohydrin, or a glycidol derivative), the aliphatic polycarbonates are characterized in that they are regioregular. Regioregularity may be expressed as the percentage of adjacent monomer units that are oriented in a head-to-tail arrangement within the polymer chain. In certain embodiments, aliphatic polycarbonate chains in the inventive polymer compositions have a head-to-tail content higher than about 80%. In certain embodiments, the head-to-tail content is higher than about 85%. In certain embodiments, the head-to-tail content is higher than about 90%. In certain embodiments, the head-to-tail content is greater than about 91%, greater than about 92%, greater than about 93%, greater than about 94%, greater than about 95%, greater than about 97%, or greater than about 99%.

In certain embodiments, the structures of aliphatic polycarbonate chains derived from the polymerization of carbon dioxide with one or more epoxides as described above are represented by the following non-limiting examples:

Structures P2a through P2s are representative of aliphatic polycarbonates derived from a diol chain transfer agent and one or more aliphatic epoxides such as propylene oxide, ethylene oxide, butylene oxide, cyclohexene oxide, 3-vinyl cyclohexene oxide, 3-ethyl cyclohexene oxide, and esters or ethers of glycidol. It is to be understood that many variations on these compounds are possible including the use of additional or different epoxides, use of different chain transfer agents (such as higher polyhydric alcohols, hydroxy acids, and polyacids), and the introduction of different Y groups. Such variations will be apparent to one skilled in the art based on the disclosure and teachings of the present application and are specifically encompassed within the scope of the present invention.

In certain embodiments, aliphatic polycarbonate chains comprise

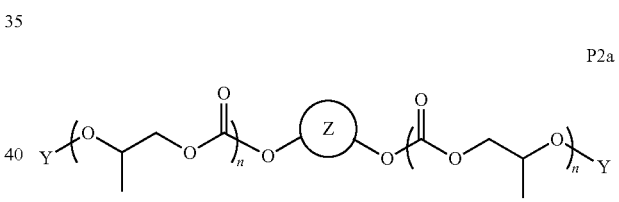

where

—Y, and n are as defined above and described in classes and subclasses herein.

In certain embodiments, aliphatic polycarbonate chains comprise

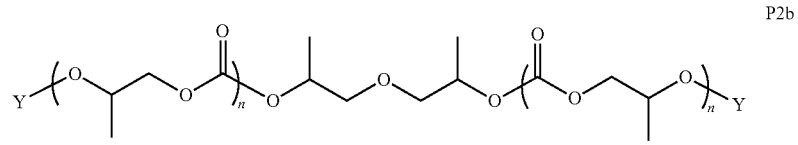

where —Y and n are as defined above and described in classes and subclasses herein.

In certain embodiments, aliphatic polycarbonate chains comprise

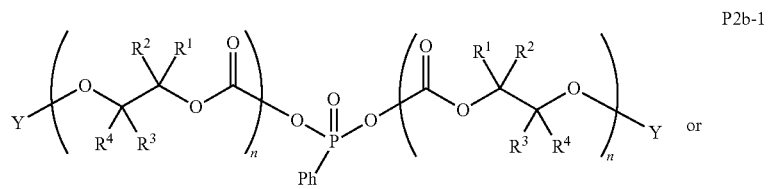

P2b-1

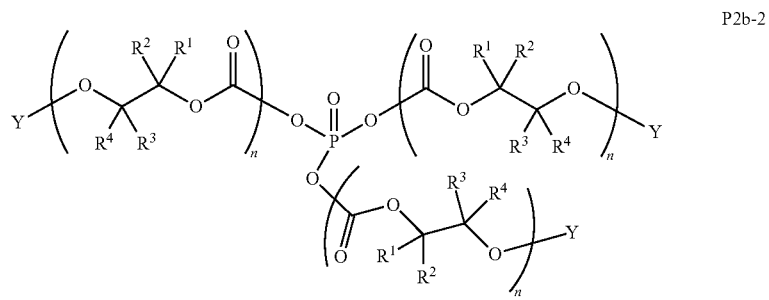

P2b-2 where —Y, $R^1$, $R^2$, $R^3$, $R^4$ and n are as defined above and described in classes and subclasses herein.

In certain embodiments, aliphatic polycarbonate chains comprise

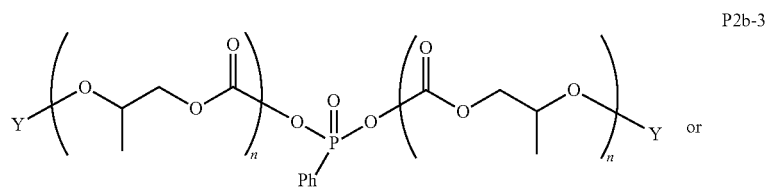

P2b-3

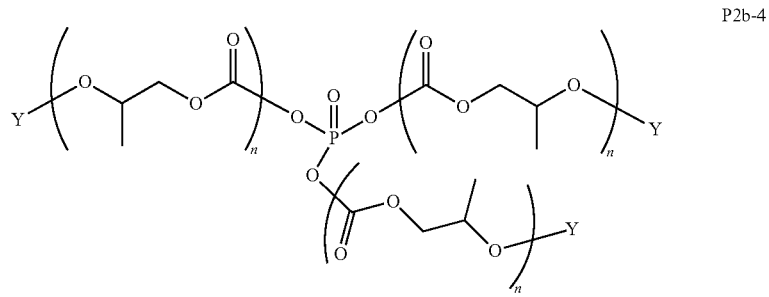

P2b-4 where —Y and n are as defined above and described in classes and subclasses herein.

In certain embodiments, aliphatic polycarbonate chains comprise

P2c where $$\underset{Z}{\bigcirc},$$

—Y, and n are as defined above and described in classes and subclasses herein.

In certain embodiments, aliphatic polycarbonate chains comprise

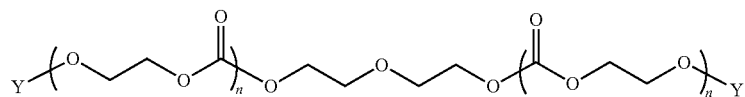

where —Y and n are as defined above and described in classes and subclasses herein.

In certain embodiments, aliphatic polycarbonate chains comprise

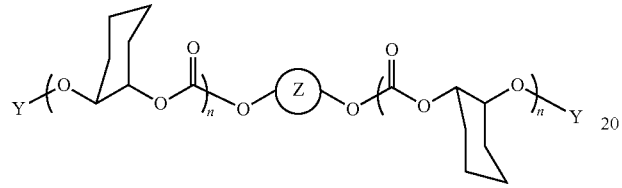

where

—Y, and n are as defined above and described in classes and subclasses herein.

In certain embodiments, aliphatic polycarbonate chains comprise

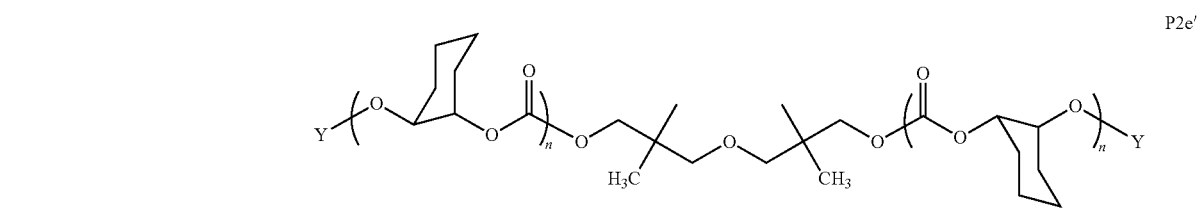

where —Y and n are as defined above and described in classes and subclasses herein.

In certain embodiments, aliphatic polycarbonate chains comprise

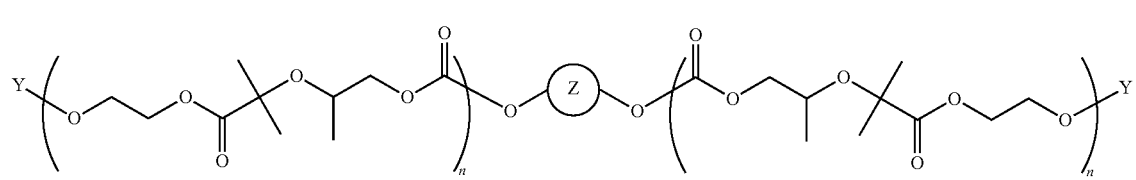

where

—Y, and n are as defined above and described in classes and subclasses herein.

In certain embodiments, aliphatic polycarbonate chains comprise

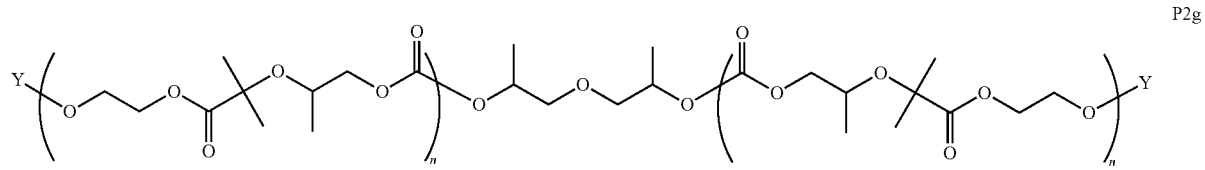

P2g where —Y and n are as defined above and described in classes and subclasses herein.

In certain embodiments, aliphatic polycarbonate chains comprise

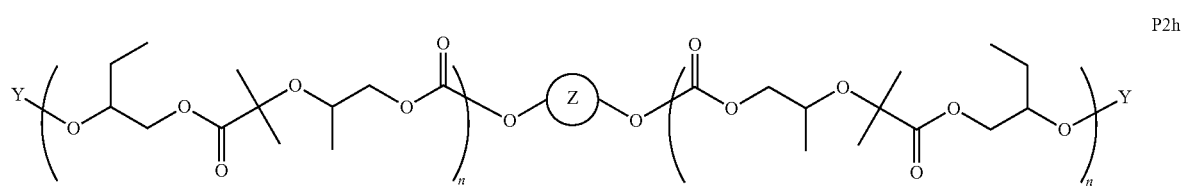

P2h where

—Y and n are as defined above and described in classes and subclasses herein.

In certain embodiments, aliphatic polycarbonate chains comprise

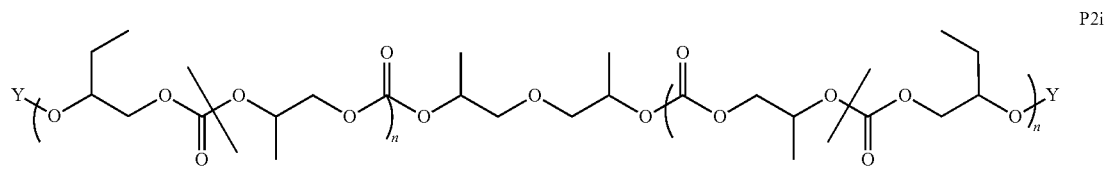

P2i where —Y and n are as defined above and described in classes and subclasses herein.

In certain embodiments, aliphatic polycarbonate chains comprise

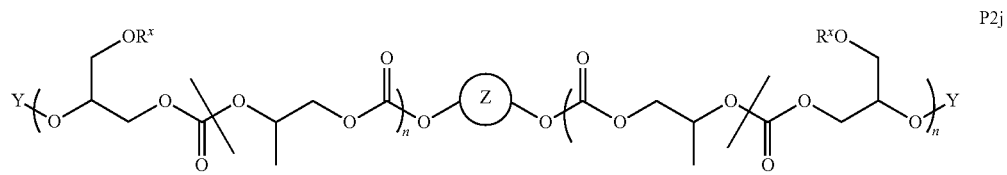

P2j where

—Y, $R^x$, and n are as defined above and described in classes and subclasses herein.

In certain embodiments, aliphatic polycarbonate chains comprise

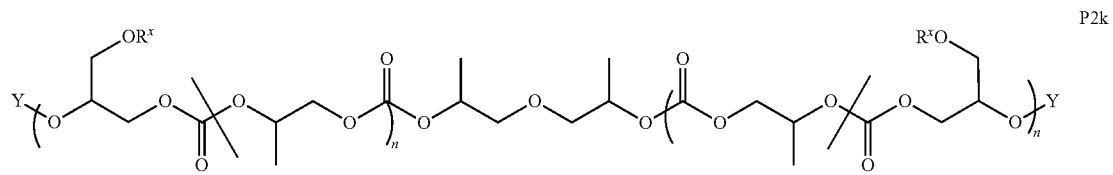

where —Y, R$^x$, and n are as defined above and described in classes and subclasses herein.

In certain embodiments, aliphatic polycarbonate chains comprise

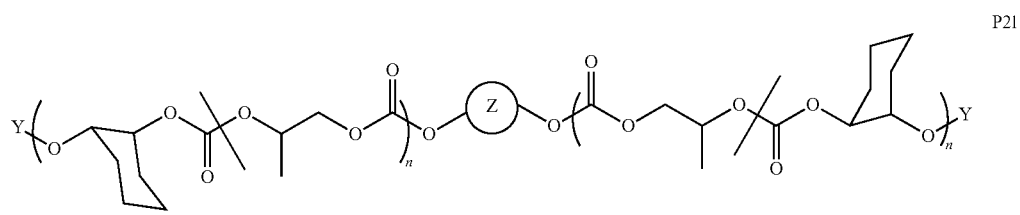

where

—Y, and n are as defined above and described in classes and subclasses herein.

In certain embodiments, aliphatic polycarbonate chains comprise where

—Y, and n are as defined above and described in classes and subclasses herein, and ═ is a single or double bond.

In certain embodiments, aliphatic polycarbonate chains comprise

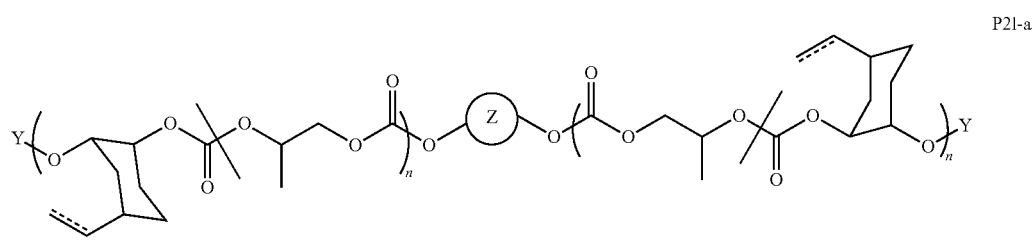

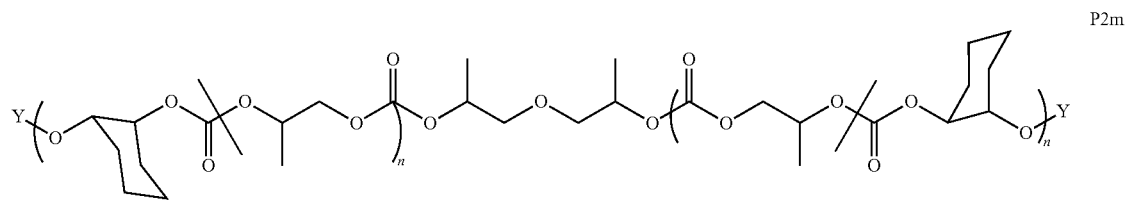

where —Y and n are as defined above and described in classes and subclasses herein.

In certain embodiments, aliphatic polycarbonate chains comprise

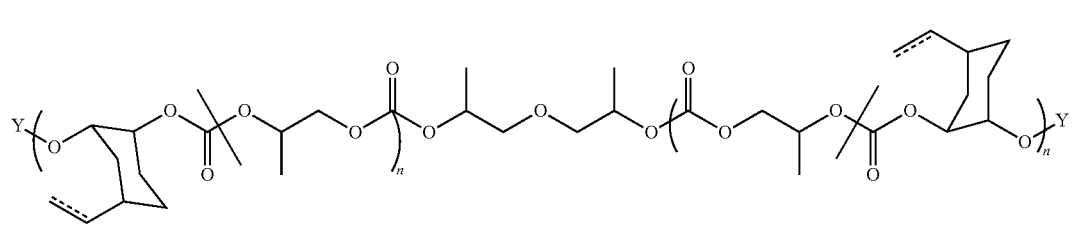
P2m-a where —Y, ═, and n are as defined above and described in classes and subclasses herein.

In certain embodiments, aliphatic polycarbonate chains comprise

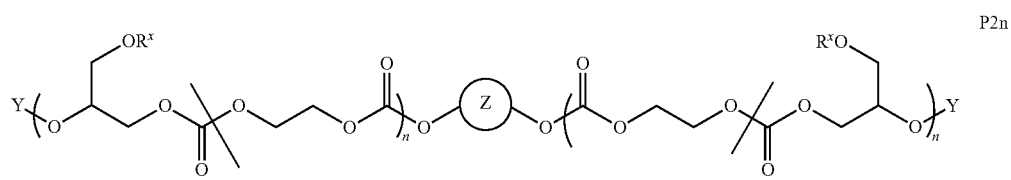
P2n where ,

—Y, and n are as defined above and described in classes and subclasses herein.

In certain embodiments, aliphatic polycarbonate chains comprise where , —Y, and n are as defined above and described in classes and subclasses herein.

In certain embodiments, aliphatic polycarbonate chains comprise

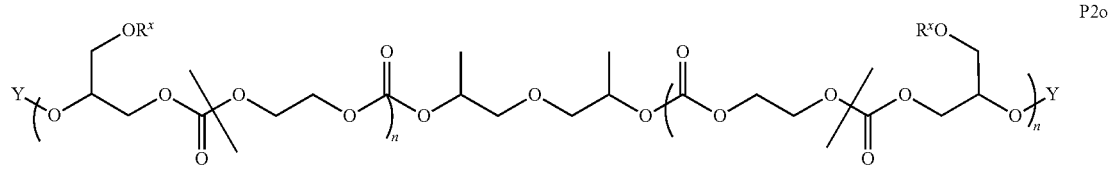
P2o where —Y, $R^x$, and n are as defined above and described in classes and subclasses herein.

In certain embodiments, aliphatic polycarbonate chains comprise

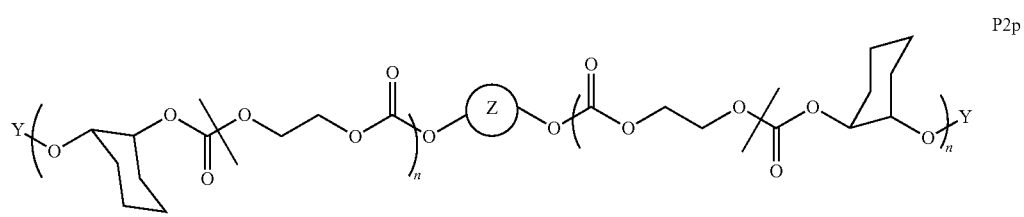
P2p

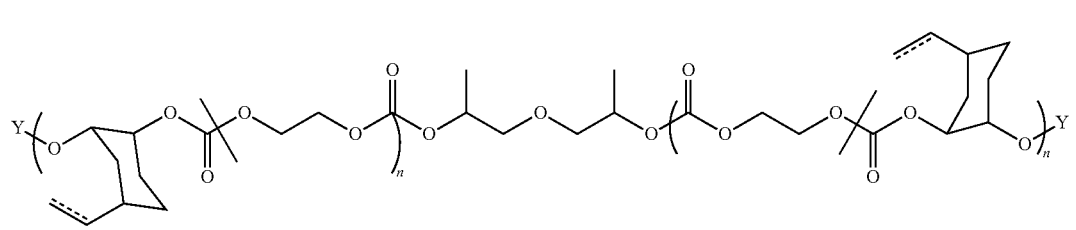

P2p-a where —Y, ═, and n are as defined above and described in classes and subclasses herein.

In certain embodiments, aliphatic polycarbonate chains comprise

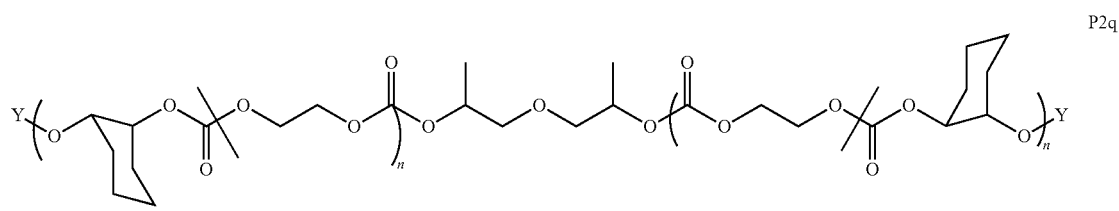

P2q where —Y and n are as defined above and described in classes and subclasses herein.

In certain embodiments, aliphatic polycarbonate chains comprise

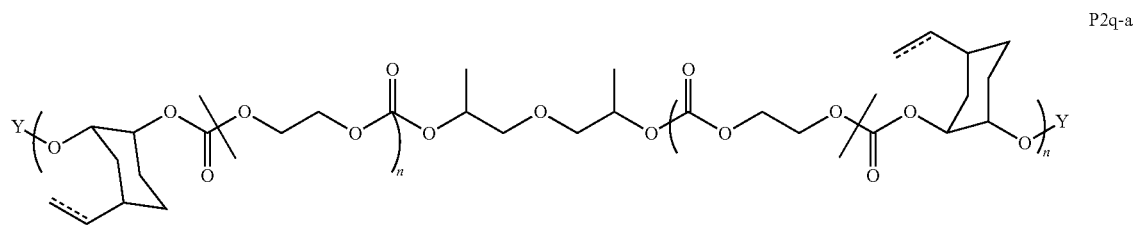

P2q-a where —Y, ═, and n are as defined above and described in classes and subclasses herein.

In certain embodiments, aliphatic polycarbonate chains comprise

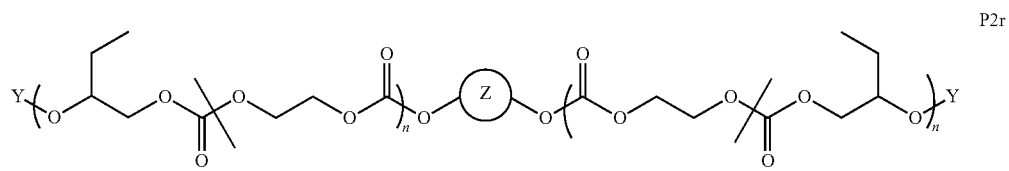

P2r where , —Y, and n are as defined above and described in classes and subclasses herein.

In certain embodiments, in polycarbonates of structures P2a through P2r having a  group,

is selected from the group consisting of: ethylene glycol; diethylene glycol, triethylene glycol, 1,3 propane diol; 1,4 butane diol, hexylene glycol, propylene glycol, dipropylene glycol, tripopylene glycol, and alkoxylated derivatives of any of these.

In certain embodiments, aliphatic polycarbonate chains comprise

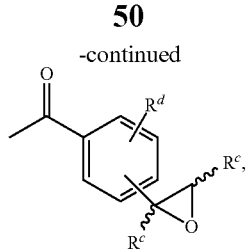

where $R^c$, $R^d$, $R^y$, and p are as defined above and described in classes and subclasses herein.

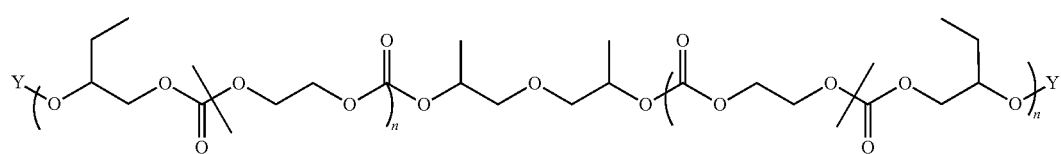

where —Y and n are as defined above and described in classes and subclasses herein.

In certain embodiments, in polycarbonates of structure P2a through P2s, —Y is selected from the group consisting of:

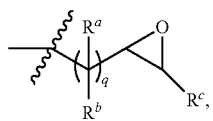

where $R^a$, $R^b$, $R^c$, and q are as defined above and described in classes and subclasses herein.

In certain embodiments, in polycarbonates of structure P2a through P2s, —Y is selected from the group consisting of:

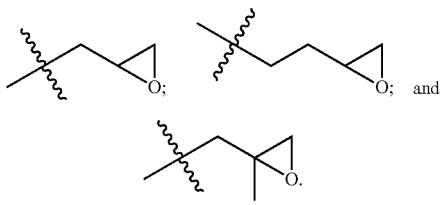

In certain embodiments, in polycarbonates of structure P2a through P2s, —Y is selected from the group consisting of:

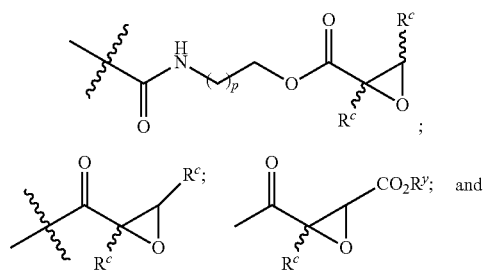

For polycarbonates comprising repeat units derived from two or more epoxides, it is to be understood that the structures drawn may represent mixtures of positional isomers or regioisomers that are not explicitly depicted. For example, the polymer repeat unit adjacent to either end groups of the polycarbonate chains can be derived from either one of the two epoxides comprising the copolymers. Thus, while the polymers may be drawn with a particular repeat unit attached to an end group, the terminal repeat units might be derived from either of the two epoxides and a given polymer composition might comprise a mixture of all of the possibilities in varying ratios. The ratio of these end-groups can be influenced by several factors including the ratio of the different epoxides used in the polymerization, the structure of the catalyst used, the reaction conditions used (i.e. temperature pressure, etc.) as well as by the timing of addition of reaction components. Furthermore, chemical structures depicted herein are representative of polymer chains that comprise polymer compositions of the present invention. Therefore, while the drawings above may show a defined regiochemistry for repeat units derived from substituted epoxides, the polymer compositions will, in some cases, contain mixtures of regioisomers. The regioselectivity of a given polymerization can be influenced by numerous factors including the structure of the catalyst used and the reaction conditions employed. To clarify, this means that the composition represented by structure P2r above, may contain a mixture of several compounds as shown in the diagram below. This diagram shows the isomers graphically for polymer P2r, where the structures below the depiction of the chain show each regio- and positional isomer possible for the monomer unit adjacent to the chain transfer agent and the end groups on each side of the main polymer chain. Each end group on the polymer may be independently selected from the groups shown on the left or right while the central portion of the polymer including the chain transfer agent and its two adjacent monomer units may be independently selected from the groups shown. In certain embodiments, the polymer composition comprises a mixture of all possible combinations of these. In other embodiments, the polymer composition is enriched in one or more of these.

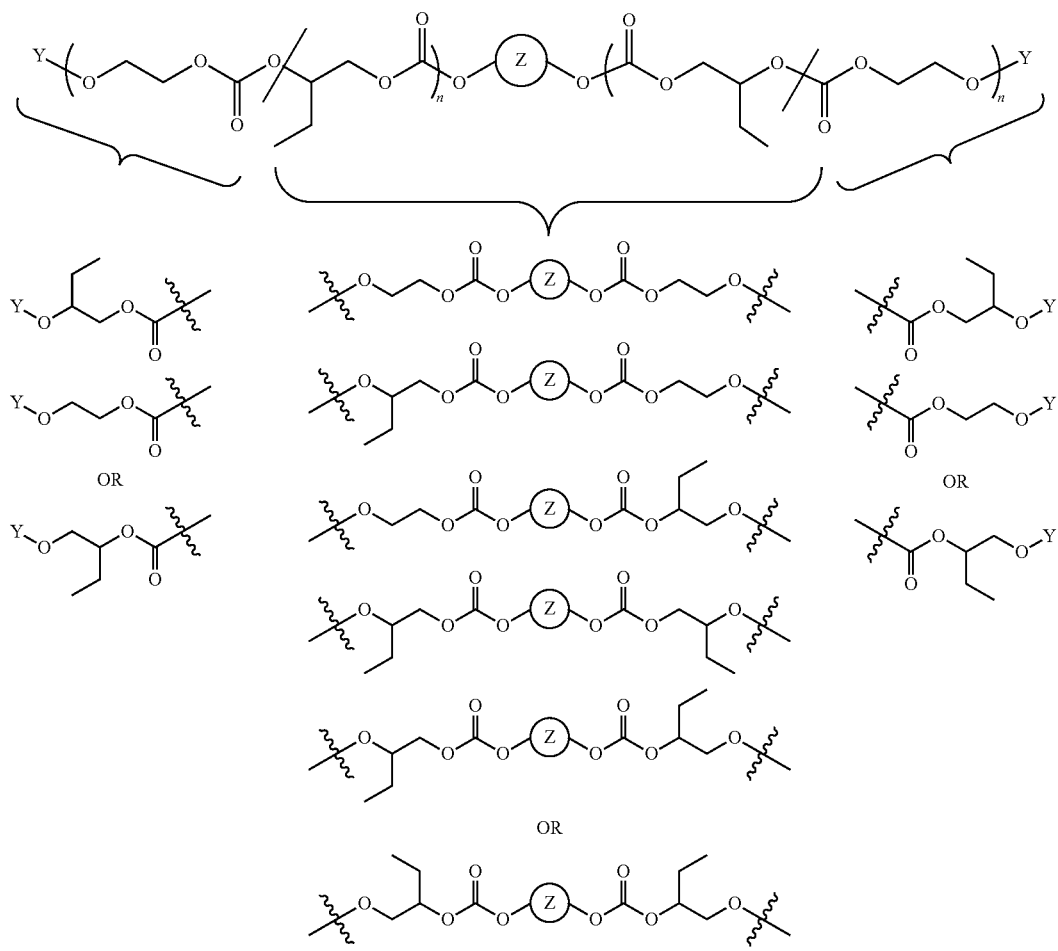

Likewise, certain small molecules depicted herein may comprise mixtures of regio- and/or stereoisomers, but be depicted in only one form. For example, dipropylene glycol (DPG) as provided commercially comprises a mixture of regioisomeric and stereoisomeric compounds. Thus while such molecules may be depicted as one regioisomer for convenience, it will be understood by one skilled in the art that the compound may actually contain a mixture of isomeric dipropylene glycol moieties.

In another aspect, the present invention encompasses polymer compositions resulting from epoxide ring-opening reactions incorporating the aliphatic polycarbonate compositions described hereinabove. In certain embodiments, such materials are derived by chain-extending or cross-linking the aliphatic polycarbonate chains by exposing the epoxy groups in the —Y moieties to nucleophilic monomers or prepolymers optionally in the presence of initiators or catalysts.

In another aspect, the present invention encompasses methods of producing aliphatic polycarbonate chains having end groups that contain epoxide functional groups.

In certain embodiments, the present invention encompasses a method of treating an aliphatic polycarbonate polymer of formula

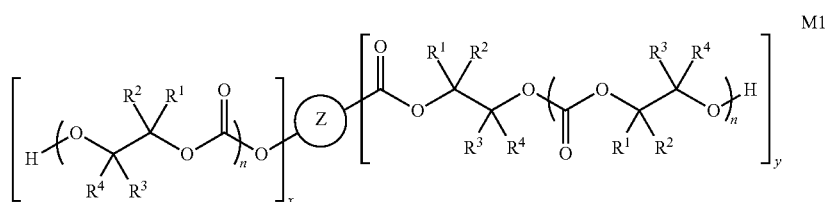

M1: with an alkylating agent, an acylating agent, or an isocyanate to provide a compound of formula P1:

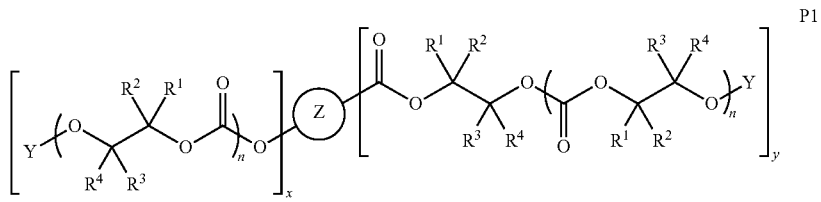

where $R^1$, $R^2$, $R^3$, $R^4$, n, x, y, Y and

are as defined hereinabove and described in classes and subclasses herein.

In certain embodiments, methods of the present invention include the step of treating a polymer of formula M1 with an alkylating agent, an acylating agent, or an isocyanate containing one or more epoxide functional groups. In certain embodiments, the methods of the present invention include the step of treating a polymer of formula M1 under conditions to convert it to a compound of any of formulae P1 through P8 as defined hereinabove.

In certain embodiments, the step of treating the compound of formula M1 comprises providing an alkyl halide or alkyl sulfonate alkylating agent in combination with a base. In certain embodiments, the alkylating agent comprises epichlorohydrin.

In certain embodiments, methods of treating a polymer of formula M1 with an alkylating agent, an acylating agent, or an isocyanate include the addition of a solvent. In certain embodiments, added solvents include non-protic organic solvents. In certain embodiments, added solvents are selected from the group consisting of ethers, esters, amides, nitriles, aliphatic hydrocarbons, halogenated hydrocarbons, aromatic hydrocarbons, and combinations of any two or more of these.

In certain embodiments, methods of treating a polymer of formula M1 with an alkylating agent, an acylating agent, or an isocyanate include the addition of a catalyst or promoter. In certain embodiments, added catalysts or promoters include bases. In certain embodiments, bases are selected from the group consisting of aromatic amines, aliphatic amines, nitrogen-containing heterocycles, and combinations of two or more of these. In certain embodiments, added catalysts or promoters include metal salts. In certain embodiments, added metal salts include metal sulfonates. In certain embodiments, added metal salts include metal triflates. In certain embodiments, added metal salts include tin compounds. In certain embodiments, added metal salts include compounds or complexes of transition metals. In certain embodiments, added metal salts include molybdenum complexes. In certain embodiments, added catalysts or promoters include acids. In certain embodiments, added acids are selected from the group consisting of alkyl or aryl sulfonic acids. In certain embodiments, added acids include triflic acid.

In certain embodiments, methods of the present invention include the step of treating a polymer of formula M2a with epichlorohydrin to provide a compound of formula P2a':

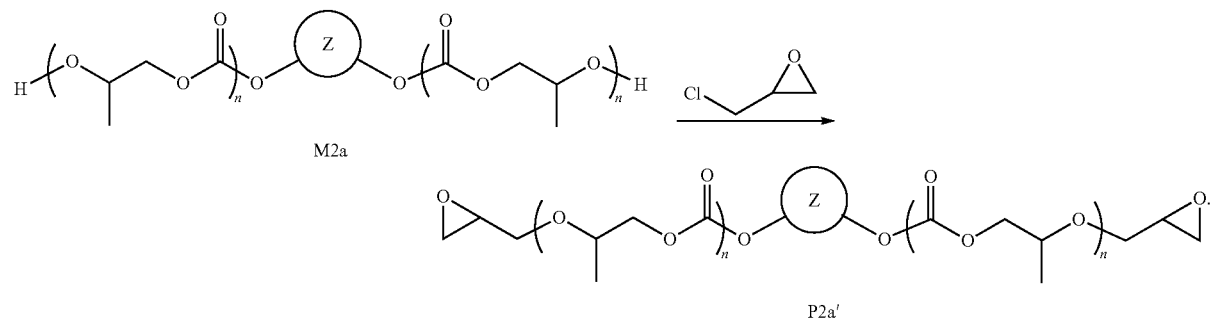

In another aspect, the present invention encompasses compounds resulting from the addition of nucleophiles to aliphatic polycarbonate compositions comprising substructures of formula IIa:

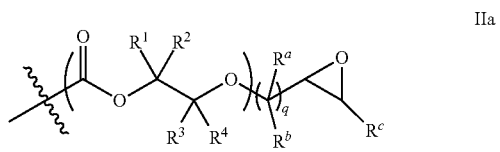

where $R^1$, $R^2$, $R^3$, $R^4$, $R^a$, $R^b$, $R^c$, and q are as defined above and described in classes and subclasses herein.

In some embodiments, the products of such additions comprise substructures having formulae:

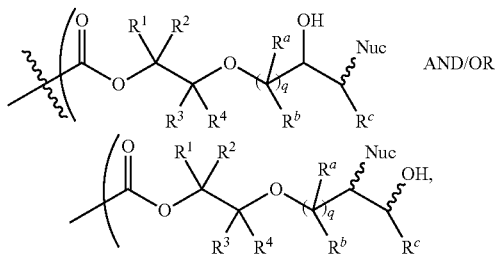

AND/OR wherein Nuc represents the bonded form of any suitable nucleophile and wherein $R^1$, $R^2$, $R^3$, $R^4$, $R^a$, $R^b$, $R^c$, and q are as defined above and described in classes and subclasses herein. In some embodiments, a suitable nucleophile is as defined below for a nucleophilic reagent. In certain embodiments, a nucleophile comprises a polyamine compound.

In certain embodiments, the present invention encompasses methods of forming polymeric materials comprising the step of contacting one or more aliphatic polycarbonates containing epoxide functional groups as defined hereinabove, with a nucleophilic reagent under conditions that cause at least some of the epoxide groups on the aliphatic polycarbonates to become linked to the nucleophilic reagent.

In certain embodiments, the nucleophilic reagent contains two or more nucleophilic functional groups. In certain embodiments, the nucleophilic reagent is a polyamine compound.

In certain embodiments, the nucleophilic reagent comprises aliphatic, cycloaliphatic or araliphatic amines as for example: 1,2-diaminoethane (ethylenediamine (EDA)); 1,2-propanediamine; 1,3-propanediamine; 1,4-diaminobutane; 2,2-dimethyl-1,3-propanediamine (neopentanediamine); diethylaminopropylamine (DEAPA); 2-methyl-1,5-diaminopentane; 1,3-diaminopentane; 2,2,4-Trimethyl-1,6-diaminohexane or 2,4,4-Trimethyl-1,6-diaminohexane and mixtures thereof (TMD); 1-amino-3-aminomethyl-3,5,5-trimethylcyclohexane; 1,3-bis(aminomethyl)-cyclohexane; 1,2-bis(aminomethyl)cyclohexane; hexamethylenediamine (HMD); 1,2- and 1,4-diaminocyclohexane (1,2-DACH and 1,4-DACH); bis(4-aminocyclohexyl)methane; bis(4-amino-3-methylcyclohexyl)methane; diethylenetriamine (DETA); 4-azaheptane-1,7-diamine; 1,11-diamino-3,6,9-trioxundecane; 1,8-diamino-3,6-dioxaoctane; 1,5-diamino-methyl-3-azapentane; 1,10-diamino-4,7-dioxadecane; Bis(3-aminopropyl)amine; 1,13-diamino-4,7-10 trioxatridecane; 4-aminomethyl-1,8-diaminooctane; 2-butyl-2-ethyl-1,5-diaminopentane; N,N-Bis-(3-aminopropyl)methylamine; triethylenetetramine (TETA); tetraethylenepentamine (TEPA); pentaethylenehexamine (PEHA); Bis(4-amino-3-methylcyclohexyl)methane; m-xylylenediamine (MXDA); 5-(aminomethyl)bicyclo[[2.2.1]hept-2-yl]methylamine (NBDA norbornanediamine); dimethyldipropylenetriamine; dimethylaminopropyl-aminopropylamine (DMAPAPA); 3-aminomethyl-3,5,5-trimethylcyclohexylamine (or isophoronediamine (IPD)); diaminodicyclohexylmethane (PACM); dimethyldiaminodicyclohexylmethane (Laromin C260); 2,2-Bis(4-aminocyclohexyl)propane; bis aminomethyl-dicyclopentadiene (tricyclodecyldiamine (TCD)); imidazoline-group-containing polyaminoamides derived from aliphatic polyethylene polyamines and dimerized or trimerized fatty acids and adducts thereof made from glycidyl compounds. In some embodiments, polyoxyalkylene polyamines, known as Jeffamine™, from Huntsman like D-230, D-400, D-2000, T-403, T-3000, T-5000, ED-600, ED-900, EDR148, XTJ 590 and polyiminoalkylene polyamines, known as Polymin™, can be used as well.

Further suitable polyamines include 1,14-diamino-4,11-dioxatetradecane; dipropylenetriamine; 2-methyl-1,5-pentanediamine; N,N'-dicyclohexyl-1,6-hexanediamine; N,N'-dimethyl-1,3-diaminopropane; N,N'-diethyl-1,3-diaminopropane; N,N-dimethyl-1,3-diaminopropane; secondary polyoxypropylenedi- and triamine; 2,5-diamino-2,5-dimethylhexane; bis-(amino-methyl)tricyclopentadiene; 1,8-Diamino-p-menthane; Bis-(4-amino-3,5-dimethylcyclohexyl)methane; 1,3-Bis(aminomethyl)cyclohexane (1,3-BAC); dipentylamine. N-2-(aminoethyl)piperazine (N-AEP); N-3-(aminopropyl)piperazine; piperazine.

In certain embodiments, a nucleophilic reagent may comprise a mixture of two or more compounds. In certain embodiments, a nucleophilic reagent comprises a mixture of two or more of the above-described polyamine reagents.

Composites

In certain embodiments, the present invention encompasses composites incorporating the polymer compositions described hereinabove. In certain embodiments, such composites further comprise fibers or solids. In certain embodiments, such fibers or solids are coated with or embedded in the polymer compositions described hereinabove. In certain embodiments, the composites comprise glass fibers, carbon fibers, ceramic fibers, mineral fibers and the like. In certain embodiments, the composites comprise inorganic materials such as clays, ceramics, alumina, silicaceous minerals, and the like. In certain embodiments, the composites comprise organic solids such as wood fibers, paper, cellulose, plant-derived fibers, and the like. In certain embodiments, the composites comprise nano particles or related particulate materials. In certain embodiments, the composites comprise carbon nanotubes or other carbon fibers. In certain embodiments, the composites comprise other polymers in the form of sheets, fibers, scrims and the like. It will be appreciated that resin formulations of provided polymer compositions are useful in various composite or coating applications.

It is well known in the art that certain components may be added to composites to improve various properties. In certain embodiments, flame and smoke retardants are added to composite formulations to improve heat and fire resistance properties and to reduce the amount of smoke generated upon combustion. Common flame and smoke retardant additives include aluminum trihydrate, dimethyl methyl phosphonate, chlorendic anhydride, tetrabromophthalic anhydride, dibromoneopentyl glycol, and tetrabromobisphenol. Additional examples include Albermarle's ANTIBLAZE™ and SAYTEX™ additives.

In certain embodiments, low profile or low shrink additives are used with provided composites to promote smooth surfaces and to reduce shrinkage of the finished composite material. A number of additives can be incorporated into the composite formulation for this purpose including Reichhold's POLYLITE 31702-40 and POLYLITE 31701-35 additives.

In certain embodiments, rheology modifiers and thixotropic agents are used to control the viscosity of a resin. Common additives in this category include silicas and organoclays. Additional examples include BYK's BYK-R 605™ and BYK-R 606™ rheology additives.

In some embodiments, surface conditioning and barrier forming agents are included in the composite formulation to minimize air inhibition and decrease surface tack. Common surface conditioning and barrier forming additives include paraffins, polyethers, and polysiloxanes. In some embodiments, additives of this type include Reichhold's Paraffin Wax Solution and BYK's BYK-W 909™ additive.

In some embodiments, fillers and reinforcement materials are added to increase composite strength. In some embodiments the additive is calcium carbonate, calcium sulfate, aluminum trihydrate, silica, alumina, silica-alumina, silica-magnesia, calcium silicate, glass beads, glass flakes, glass fibers, carbon fibers, aramid fibers, or asbestos. Particular examples of these materials include 3M's Glass Bubbles, PPG's ChoppVantage series of fibers, and AGY's S-2 Glass products line.

In some embodiments plasticizers act as dispersion agents within the composite formulation to increase plasticity and fluidity within the resin. Suitable additives of this type are BASF's Palatinol 11P-E and Dow Chemical's Diethylene Glycol Resin.

It will be appreciated that a number of other additives may be added to the resin system including UV stabilizers and absorbents which function to guard the composite against long-term degradation due to light (eg. Chemtura's Lowilite additive), accelerators and curing agents that promote resin curing, and pigments and dyes (eg. Interplastic Co.'s CoREZYN™ colorants) that give rise to composite coloring.

Each of the above-described additives and combinations thereof may be incorporated into the polymer composite in an amount up to about 80% by weight, such as in an amount up to about 50% by weight. In some embodiments, additives are incorporated into the polymer composite in an amount less than about 20% by weight, such as less than about 10% by weight. In some embodiments, additives are incorporated into the composite in an amount less than about 5% by weight, such as less than about 3% by weight. In some embodiments, additives are incorporated into a polymer in an amount less than about 2% by weight, such as from about 0.25% to about 1% by weight.

Articles of Manufacture

The present invention further provides articles of manufacture made from the polycarbonate compositions and composites described above. It is well known that polymer composites may have desirable properties over their component parts, such as increased stiffness or strength, relative to their density. In some embodiments, composite materials offer the advantages of corrosion resistance, electrical insulation, better fatigue properties, biological inertness, and decreased assembly cost. This makes such materials particularly useful in electrical, appliance, hardware, dental, orthopedic, medical device, and other biomedical applications. Composites of KEVLAR® (p-phenylene terephtalamide, PPTA, para-polyaramide) and polycarbonate are non-resorbable and are useful for long-term implants such as joint replacements, bone cement, spine rods, and dental posts; short-term uses include bone plates, rods, screws, ligaments, and catheters (Ramakrishna et al., Composites Science and Technology, 61, pp. 1189-1224, 2001). Additional common applications for such composites include windmill blades, fiberglass boats, automotive parts, sporting goods and the like.

Glass-reinforced polycarbonate is known to be useful in designs where metals (e.g., die-cast aluminum and zinc) are commonly used. For example, the addition of varying amounts of glass fibers to polycarbonate increases tensile strength, stiffness, compressive strength, and lowers the thermal expansion coefficient. Such glass-reinforced polycarbonate is generally more impact resistant than most other plastics and die cast aluminum. The present invention encompasses articles of manufacture containing glass-reinforced composites of provided polycarbonate compositions.

Examples

In this example, an epoxide-functionalized polyol of formula P2b is produced where Y is —$CH_2CHOCH_2$ and each n is approximately 15.

Propylene oxide, dipropylene glycol (DPG), cobalt catalyst and co-catalyst is added to a 2 gallon stainless steel autoclave and the polymerization is carried out according to the conditions disclosed in WO 2010028362. After the allotted reaction time, the reaction is quenched and the polyol is purified according to the conditions disclosed in WO 2010033705 and WO 2010033703, respectively to provide a PPC polyol having a number average molecular weight of approximately 3000 g/mol.

The isolated PPC polyol is then dissolved in dimethoxyethane and treated with epichlorohydrin to convert the terminal hydroxy groups to glycidyl ether groups.

Other Embodiments

The foregoing has been a description of certain non-limiting embodiments of the invention. Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A polymer composition comprising aliphatic polycarbonate chains having epoxy functional groups, wherein
   a) the aliphatic polycarbonate comprises a repeating unit having a structure:

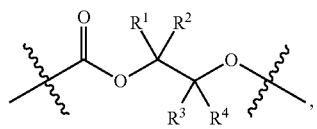

where $R^1$, $R^2$, $R^3$, and $R^4$ are, at each occurrence in the polymer chain, independently selected from the group consisting of —H, fluorine, and an optionally substituted $C_{1-20}$ aliphatic group, where any two or more of $R^1$, $R^2$, $R^3$, and $R^4$ may optionally be taken together with intervening atoms to form one or more optionally substituted rings optionally containing one or more heteroatoms;

c) the molecular weight of the aliphatic polycarbonate chains is on average in the range of about 500 g/mol to about 500,000 g/mol.

2. The polymer composition of claim 1, wherein the epoxy functional groups are disposed at one or more ends of the aliphatic carbonate chains.

3. The polymer composition of claim 2, wherein the epoxy functional groups disposed at the ends of the aliphatic carbonate chains are independently selected from the group consisting of:

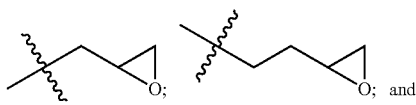

-continued

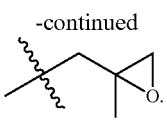

4. The polymer composition of claim 2, comprising aliphatic polycarbonate chains having a formula:

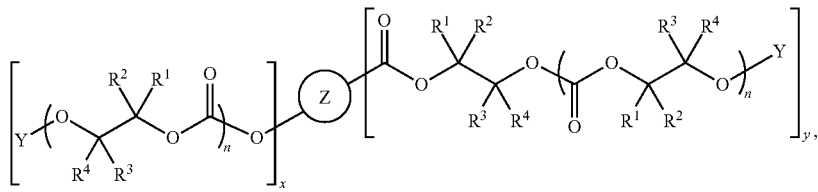

wherein:
Y is, at each occurrence an epoxide-containing moiety and each Y may be the same or different,

is a multivalent moiety,
x and y are each independently from 0 to 6, where the sum of x and y is between 2 and 6, inclusive, and
n is independently at each occurrence from 2 to 1000.

5. The polymer composition of claim 4, wherein Y is, at each occurrence, independently selected from the group consisting of:

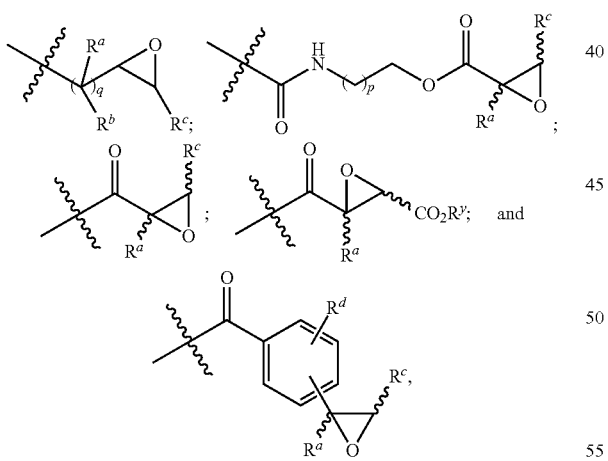

wherein $R^a$ and $R^b$, are, at each occurrence, independently selected from the group consisting of —H, halogen, an optionally substituted $C_{1-20}$ aliphatic group, an optionally substituted $C_{1-20}$ heteroaliphatic group, an optionally substituted acyloxy group, an optionally substituted acyl group, an optionally substituted alkoxy group, an optionally substituted carbocyclic group and an optionally substituted heterocyclic group, where any two or more $R^a$ and $R^b$ groups may optionally be taken together with intervening atoms to form one or more optionally substituted rings optionally containing one or more heteroatoms;

$R^c$, is at each occurrence, independently selected from the group consisting of —H, an optionally substituted $C_{1-20}$ aliphatic group, an optionally substituted $C_{1-20}$ heteroaliphatic group, an optionally substituted carbocyclic group and an optionally substituted heterocyclic group, where any two or more $R^c$ groups may optionally be taken together with intervening atoms and any $R^a$ or $R^b$ group to form one or more optionally substituted rings optionally containing one or more heteroatoms;

$R^d$ is, at each occurrence, independently selected from the group consisting of: halogen, —$NO_2$, —CN, —$SR^y$, —$S(O)R^y$, —$S(O)_2R^y$, —$NR^yC(O)R^y$, —$OC(O)R^y$, —$CO_2R^y$, —NCO, —$N_3$, —$OR^y$, —$OC(O)N(R^y)_2$, —$N(R^y)_2$, —$NR^yC(O)R^y$, —$NR^yC(O)OR^y$; or an optionally substituted radical selected from the group consisting of $C_{1-20}$ aliphatic; $C_{1-20}$ heteroaliphatic; phenyl; a 3- to 8-membered saturated or partially unsaturated monocyclic carbocycle, a 7-14 carbon saturated, partially unsaturated or aromatic polycyclic carbocycle; a 5- to 6-membered monocyclic heteroaryl ring having 1-4 heteroatoms independently selected from nitrogen, oxygen, or sulfur; a 3- to 8-membered saturated or partially unsaturated heterocyclic ring having 1-3 heteroatoms independently selected from nitrogen, oxygen, or sulfur; a 6- to 12-membered polycyclic saturated or partially unsaturated heterocycle having 1-5 heteroatoms independently selected from nitrogen, oxygen, or sulfur; or an 8- to 10-membered bicyclic heteroaryl ring having 1-5 heteroatoms independently selected from nitrogen, oxygen, or sulfur; and where each occurrence of $R^y$ is independently —H, or an optionally substituted radical selected from the group consisting of $C_{1-6}$ aliphatic, 3- to 7-membered heterocyclic, phenyl, and 8- to 10-membered aryl, and where two or more adjacent $R^d$ groups can be taken together to form an optionally substituted saturated, partially unsaturated, or aromatic 5- to 12-membered ring containing 0 to 4 heteroatoms;

p is from 1 to 6, inclusive; and
q is from 1 to 10, inclusive.

6. The polymer composition of claim 4, wherein Y is independently selected from the group consisting of:

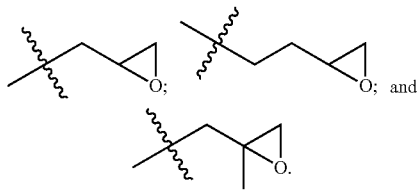

7. The polymer composition of claim 6, wherein Y has the formula:

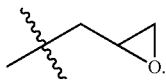 [SMILES: *CC1CO1]

8. The polymer composition of claim 1, comprising aliphatic polycarbonate chains having a formula:

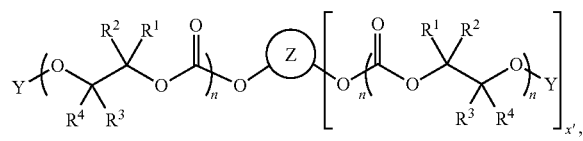

Y is, at each occurrence an epoxide-containing moiety and each Y may be the same or different;

is a multivalent moiety;
n is independently at each occurrence from 2 to 1000; and
wherein x' is from 1 to 5, inclusive.

9. The polymer composition of claim 8, wherein

is derived from a dihydric alcohol.

10. The polymer composition of claim 9, wherein the dihydric alcohol comprises a $C_{2-40}$ diol.

11. The polymer composition of claim 10, wherein the dihydric alcohol is selected from the group consisting of: 1,2-ethanediol, 1,2-propanediol, 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, isosorbide, glycerol monoesters, glycerol monoethers, trimethylolpropane monoesters, trimethylolpropane monoethers, pentaerythritol diesters, pentaerythritol diethers and alkoxylated derivatives of any of these.

12. The polymer composition of claim 10, wherein the dihydric alcohol is selected from the group consisting of: diethylene glycol, triethylene glycol, tetraethylene glycol, hexylene glycol, higher poly(ethylene glycol), such as those having number average molecular weights of from 220 to about 2000 g/mol, dipropylene glycol, tripropylene glycol, and higher poly(propylene glycols) such as those having number average molecular weights of from 234 to about 2000 g/mol.

13. The polymer composition of claim 10, wherein the dihydric alcohol comprises an alkoxylated derivative of a compound selected from the group consisting of: a diacid, a diol, or a hydroxy acid.

14. The polymer composition of claim 13, wherein the alkoxylated derivative comprises an ethoxylated or propoxylated compound.

15. The polymer composition of claim 9, wherein the dihydric alcohol comprises a polymeric diol.

16. The polymer composition of claim 15, wherein the polymeric diol is selected from the group consisting of polyethers, polyesters, hydroxy-terminated polyolefins, and polyether-copolyesters, polyether polycarbonates, polycarbonate-copolyesters, and alkoxylated analogs of any of these.

17. The polymer composition of claim 15, wherein the polymeric diol has an average molecular weight less than about 2000 g/mol.

18. The polymer composition of claim 8, wherein

is derived from a polyhydric alcohol.

19. The polymer composition of claim 18, wherein the polyhydric alcohol comprises a $C_{2-40}$ triol.

20. The polymer composition of claim 19, comprising aliphatic polycarbonate chains having a formula:

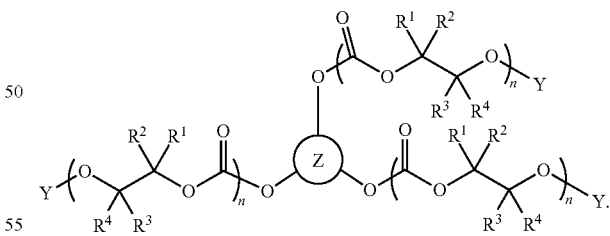

21. The polymer composition of claim 20, wherein the polyhydric alcohol is selected from the group consisting of: glycerol, 1,2,4-butanetriol, 2-(hydroxymethyl)-1,3-propanediol; hexane triols, trimethylol propane, trimethylol ethane, trimethylolhexane, 1,4-cyclohexanetrimethanol, pentaerythritol mono esters, pentaerythritol mono ethers, and alkoxylated analogs of any of these.

22. The polymer composition of claim 18, wherein the polyhydric alcohol comprises a $C_{2-40}$ polyol with more than three hydroxyl groups.

23. The polymer composition of claim 8, wherein

is derived from a polycarboxylic acid.

24. The polymer composition of claim 8, comprising aliphatic polycarbonate chains having a formula:

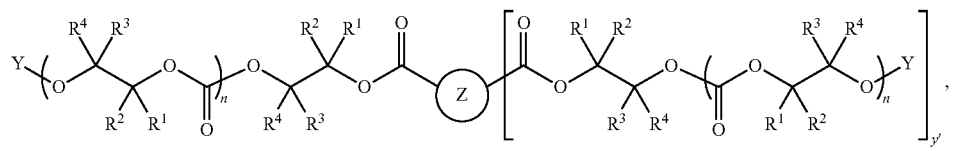

wherein y' is from 1 to 5, inclusive.

25. The polymer composition of claim 23, wherein

is derived from a dicarboxylic acid.

26. The polymer composition of claim 25, comprising aliphatic polycarbonate chains having a formula:

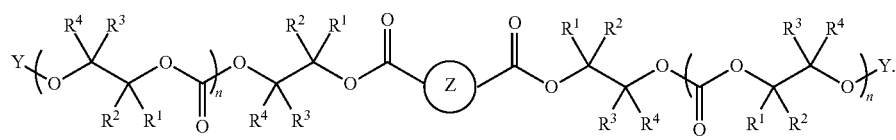

27. The polymer composition of claim 25, wherein the dicarboxylic acid is selected from the group consisting of: phthalic acid, isophthalic acid, terephthalic acid, maleic acid, succinic acid, malonic acid, glutaric acid, adipic acid, pimelic acid, suberic acid, and azelaic acid.

28. The polymer composition of claim 23, wherein the polycarboxylic acid is selected from the group consisting of:

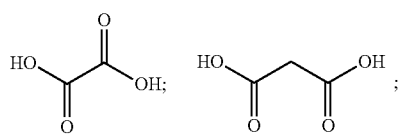

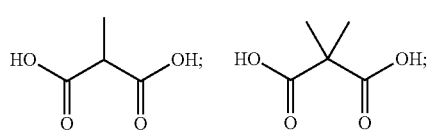

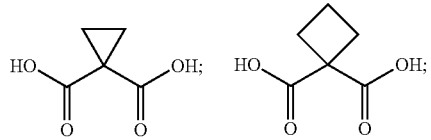

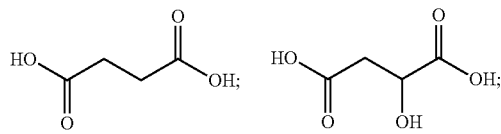

-continued

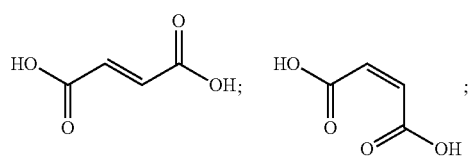

-continued

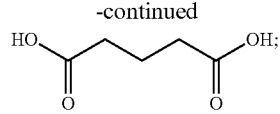

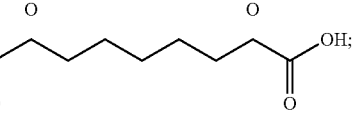

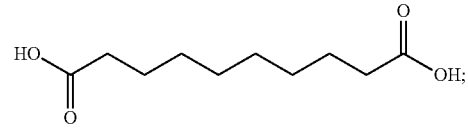

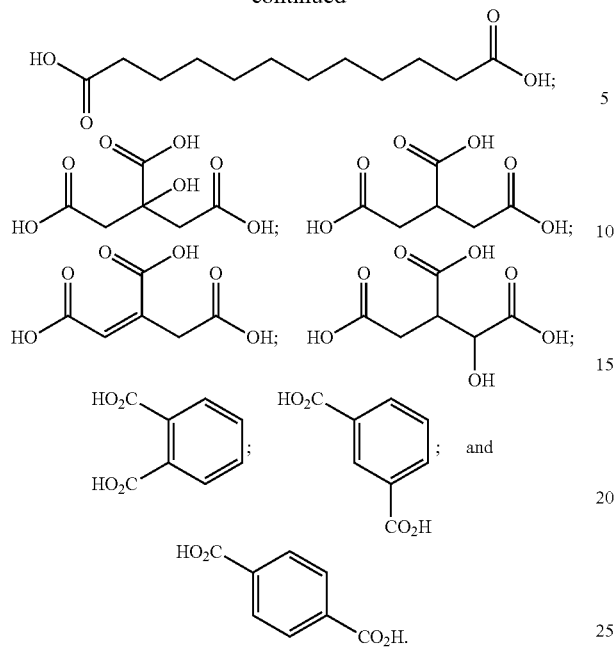

and

29. The polymer composition of claim 8, wherein

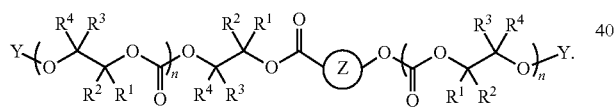

is derived from a hydroxy acid.

30. The polymer composition of claim 8, comprising aliphatic polycarbonate chains having a formula:

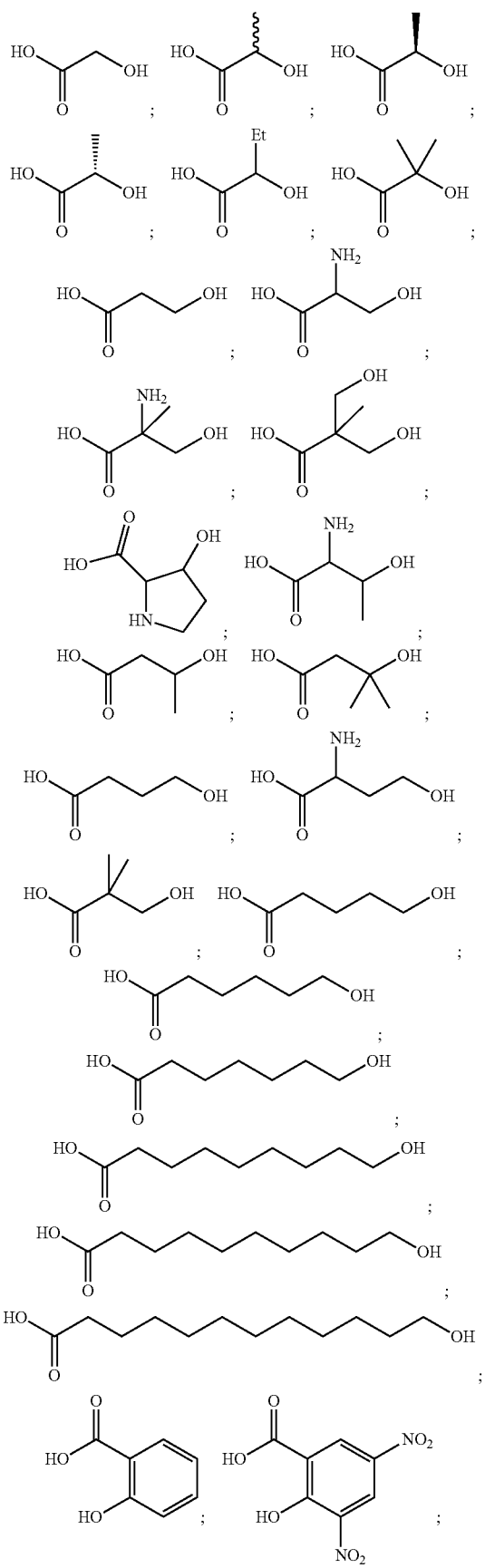

31. The polymer composition of claim 30, wherein the hydroxy acid is an alpha-hydroxy acid.

32. The polymer composition of claim 30, wherein the hydroxy acid is selected from the group consisting of: glycolic acid, DL-lactic acid, D-lactic acid, L-lactic, citric acid, and mandelic acid.

33. The polymer composition of claim 30, wherein the hydroxy acid is a beta-hydroxy acid.

34. The polymer composition of claim 30, wherein the hydroxy acid is selected from the group consisting of: 3-hydroxypropionic acid, DL 3-hydroxybutryic acid, D-3 hydroxybutryic acid, L 3-hydroxybutyric acid, DL-3-hydroxy valeric acid, D-3-hydroxy valeric acid, L-3-hydroxy valeric acid, salicylic acid, and derivatives of salicylic acid.

35. The polymer composition of claim 30, wherein the hydroxy acid is a α-ω hydroxy acid.

36. The polymer composition of claim 30, wherein the hydroxy acid is selected from the group consisting of: of optionally substituted $C_{3\text{-}20}$ aliphatic α-ω hydroxy acids and oligomeric esters.

37. The polymer composition of claim 30, wherein the hydroxy acid is selected from the group consisting of:

-continued

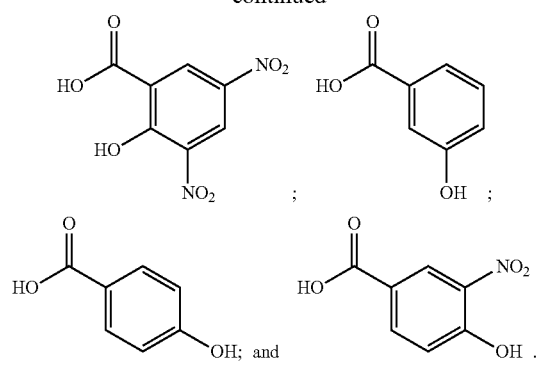

38. The polymer composition of claim 1, wherein the moiety

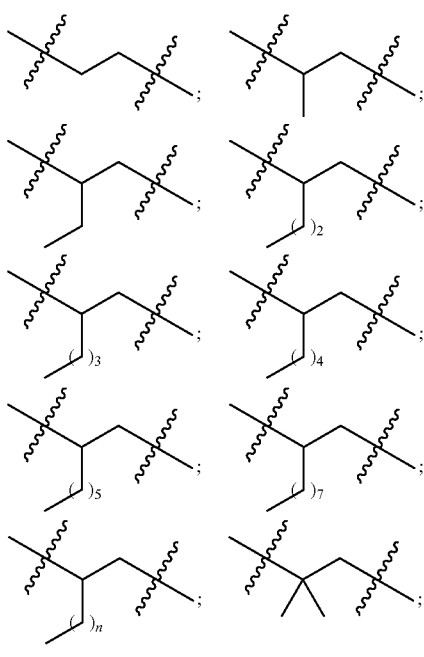

is, at each occurrence in the aliphatic polycarbonate chains, independently selected from the group consisting of:

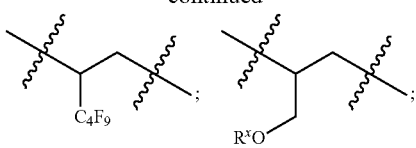

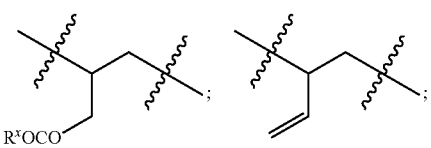

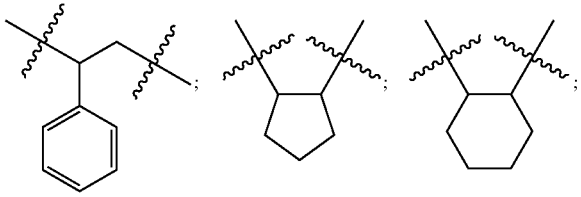

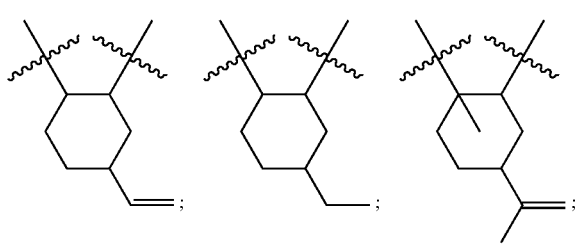

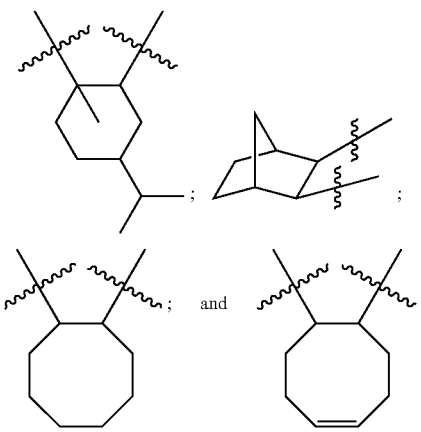

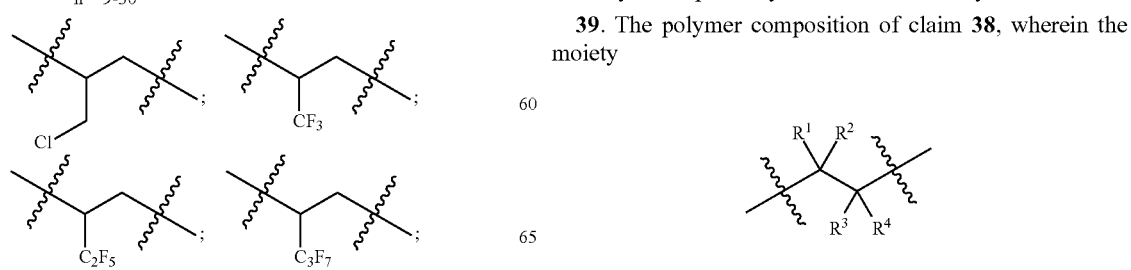

wherein each $R^x$ is independently selected from the group consisting of: optionally substituted aliphatic, optionally substituted heteroaliphatic, optionally substituted aryl and optionally substituted heteroaryl.

39. The polymer composition of claim 38, wherein the moiety is, at each occurrence in the aliphatic polycarbonate chains, independently selected from the group consisting of:

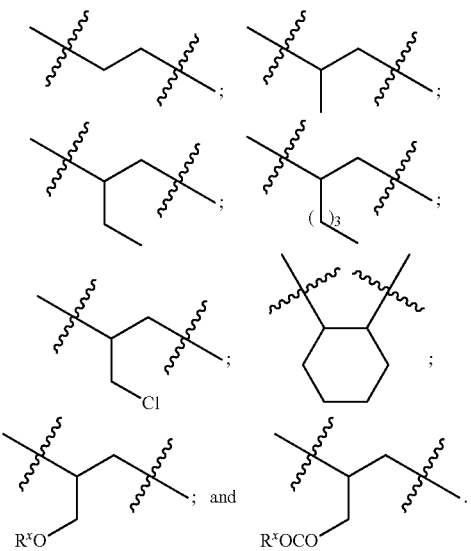

40. The polymer composition of claim 38, wherein a majority of the

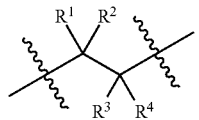

moieties in the aliphatic polycarbonate chains are:

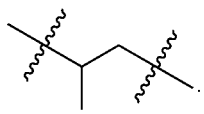

41. The polymer composition of claim 38, wherein a majority of the

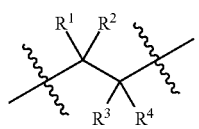

moieties in the aliphatic polycarbonate chains are:

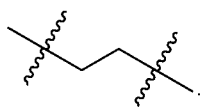 [SMILES: *CC*]

42. The polymer composition of claim 38, characterized in that the aliphatic polycarbonate chains have:
an Mn between about 500 g/mol and about 20,000 g/mol, greater than 90% carbonate linkages on average, and at least 90% of the end groups comprise epoxide-containing moieties.

43. The polymer composition of claim 42, comprising greater than 92% carbonate linkages.

44. The polymer composition of claim 42, comprising greater than 95% carbonate linkages.

45. The polymer composition of claim 42, comprising greater than 97% carbonate linkages.

46. The polymer composition of claim 42, comprising greater than 99% carbonate linkages.

47. The polymer composition of claim 42, having an Mn between about 1,000 and about 10,000 g/mol.

48. The polymer composition of claim 42, having an Mn between about 800 and about 5,000 g/mol.

49. The polymer composition of claim 42, having an Mn between about 1,000 and about 4,000 g/mol.

50. The polymer composition of claim 42, having an Mn of about 1,000 g/mol.

51. The polymer composition of claim 42, having an Mn of about 2,000 g/mol.

52. The polymer composition of claim 42, having an Mn of about 3,000 g/mol.

53. The polymer composition of claim 42, having an Mn of about 4,000 g/mol.

54. The polymer composition of claim 42, having an Mn of about 5,000 g/mol.

55. The polymer composition of claim 42, having an Mn of about 8,000 g/mol.

56. The polymer composition of claim 38, wherein the aliphatic polycarbonate has a polydispersity index of less than 1.5.

57. The polymer composition of claim 56, wherein the aliphatic polycarbonate has a polydispersity index of less than 1.4.

58. The polymer composition of claim 56, wherein the aliphatic polycarbonate has a polydispersity index of less than 1.3.

59. The polymer composition of claim 56, wherein the aliphatic polycarbonate has a polydispersity index of less than 1.2.

60. The polymer composition of claim 56, wherein the aliphatic polycarbonate has a polydispersity index of less than 1.1.

61. The polymer composition of claim 1, comprising poly (propylene carbonate) chains having a formula:

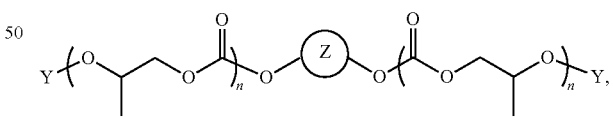

where

is selected from the group consisting of: an optionally substituted $C_{1-40}$ aliphatic group, an optionally substituted $C_{1-40}$ heteroaliphatic group, an optionally substituted aromatic compound, an optionally substituted heteroaromatic compound, a polyether, a polyester, a polyolefin, and a single bond;

Y is, at each occurrence, independently selected from group consisting of:

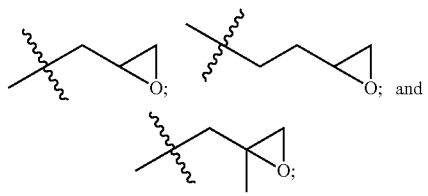

and n is, on average in the polymer an integer from about 5 to about 400.

62. The polymer composition of claim 61, wherein

is selected from the group consisting of: ethylene glycol; diethylene glycol, trimethylene glycol, 1,3 propane diol; 1,4 butane diol, propylene glycol, dipropylene glycol, tripopylene glycol, and alkoxylated derivatives of any of these.

63. The polymer composition of claim 61, wherein more than 85% of adjacent monomer groups in the poly(propylene carbonate) chains are oriented head-to-tail.

64. The polymer composition of claim 61, wherein more than 90% of adjacent monomer groups in the poly(propylene carbonate) chains are oriented head-to-tail.

* * * * *